US012704072B1

(12) United States Patent
Farley et al.

(10) Patent No.: US 12,704,072 B1
(45) Date of Patent: Aug. 11, 2026

(54) ASSEMBLY FOR GAS TURBINE ENGINE

(71) Applicant: General Electric Company, Evendale, OH (US)

(72) Inventors: Cameron W. Farley, Fort Thomas, KY (US); Michael Alan Stieg, Orlando, FL (US); Jason David Shapiro, Methuen, MA (US); Gregory Scott Phelps, Cincinnati, OH (US); Gregory Allen Willis, Cincinnati, OH (US); Jerome Geoffrey Magnant, Rexford, NY (US); Benjamin Wenning, Springboro, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/296,141

(22) Filed: Aug. 11, 2025

(51) Int. Cl.
*F01D 9/04* (2006.01)

(52) U.S. Cl.
CPC ...... *F01D 9/041* (2013.01); *F05D 2300/6033* (2013.01)

(58) Field of Classification Search
CPC ........ F01D 9/042; F01D 9/041; F01D 25/246; F01D 9/044; F01D 5/284; F01D 5/282; F01D 11/005; F01D 9/02; F01D 25/005; F01D 5/189; F01D 5/143; F01D 5/147; F01D 11/008; F01D 25/24; F01D 25/28; F01D 25/285; F01D 9/04; F01D 5/02; F01D 5/18; F01D 5/225; F01D 9/023; F05D 2300/6033; F05D 2220/32; F05D 2230/23; F05D 2250/75; F05D 2230/237; F05D 2230/60; F05D 2240/12; F05D 2300/603; F05D 2260/30; F05D 2230/236; F05D 2240/80; F05D 2230/31; F05D 2240/11; F05D 2240/14; F05D 2240/30

See application file for complete search history.

(56) References Cited

U.S. PATENT DOCUMENTS

| | | | | |
|---|---|---|---|---|
| 881,474 | A | | 3/1908 | Alexander |
| 2,674,327 | A | | 4/1954 | Pullin et al. |
| 3,627,444 | A | | 12/1971 | Lentz |
| 3,724,968 | A | | 4/1973 | Friberg et al. |
| 3,910,719 | A | | 10/1975 | Hessler et al. |
| 4,169,692 | A | | 10/1979 | McDonough et al. |
| 4,512,718 | A | | 4/1985 | Stargardter |
| 4,710,099 | A | | 12/1987 | Matsuura |
| 5,248,240 | A | * | 9/1993 | Correia .................. F01D 9/042 415/209.1 |

(Continued)

FOREIGN PATENT DOCUMENTS

| | | | |
|---|---|---|---|
| FR | 3063118 | A1 | 8/2018 |
| GB | 2106193 | A | 4/1983 |

*Primary Examiner* — Eric J Zamora Alvarez
(74) *Attorney, Agent, or Firm* — Dority & Manning, P.A.

(57) ABSTRACT

An assembly for a gas turbine engine, the assembly including a plurality of assembly segments connected in a 360 degree arrangement, each assembly segment of the plurality of assembly segments including a first band, a second band, a first vane extending from the first band to the second band, the first vane being single-formed with the first band and the second band, and a second vane extending from the first band to the second band, wherein the second vane is joined to the first band with a first joint, and the second vane is joined to the second band with a second joint.

20 Claims, 15 Drawing Sheets

(56) References Cited

U.S. PATENT DOCUMENTS

| | | | | |
|---|---|---|---|---|
| 5,332,360 | A * | 7/1994 | Correia | F01D 9/044 29/889.21 |
| 5,797,725 | A * | 8/1998 | Rhodes | B23P 6/005 415/209.2 |
| 6,200,092 | B1 | 3/2001 | Koschier | |
| 6,648,597 | B1 * | 11/2003 | Widrig | F01D 9/044 415/200 |
| 6,905,308 | B2 | 6/2005 | Hagle et al. | |
| 7,008,178 | B2 | 3/2006 | Busch et al. | |
| 7,341,427 | B2 * | 3/2008 | Farmer | F01D 9/041 415/115 |
| 7,371,046 | B2 * | 5/2008 | Lee | F01D 5/143 416/193 A |
| 8,257,032 | B2 | 9/2012 | Beeck et al. | |
| 8,454,303 | B2 * | 6/2013 | Garcia-Crespo | F01D 9/041 415/137 |
| 8,534,997 | B2 | 9/2013 | Guemmer | |
| 8,562,288 | B2 | 10/2013 | Guemmer | |
| 8,714,920 | B2 * | 5/2014 | Campbell | F01D 11/005 416/204 R |
| 8,721,290 | B2 | 5/2014 | Darkins, Jr. et al. | |
| 8,926,262 | B2 * | 1/2015 | Tanahashi | F01D 5/282 416/241 B |
| 9,068,464 | B2 * | 6/2015 | Morrison | C04B 37/001 |
| 9,194,252 | B2 * | 11/2015 | Farah | F01D 25/162 |
| 9,638,050 | B2 | 5/2017 | Takeda et al. | |
| 9,644,483 | B2 | 5/2017 | Subramaniyan et al. | |
| 9,739,154 | B2 | 8/2017 | Derclaye et al. | |
| 9,803,486 | B2 * | 10/2017 | Freeman | F01D 5/189 |
| 9,822,645 | B2 | 11/2017 | Guemmer | |
| 9,863,260 | B2 * | 1/2018 | Weaver | F01D 25/005 |
| 9,963,986 | B2 * | 5/2018 | Yagi | F01D 9/042 |
| 10,202,869 | B2 * | 2/2019 | Chang | F02C 7/20 |
| 10,240,468 | B2 * | 3/2019 | Farah | B23P 15/04 |
| 10,260,362 | B2 * | 4/2019 | Varney | F01D 5/284 |
| 10,280,798 | B2 * | 5/2019 | Sanchez | F01D 25/246 |
| 10,287,889 | B2 | 5/2019 | Moradi | |
| 10,400,616 | B2 | 9/2019 | Tuertscher et al. | |
| 10,533,425 | B2 | 1/2020 | McMahon et al. | |
| 10,746,035 | B2 * | 8/2020 | Frey | F01D 11/003 |
| 10,844,724 | B2 | 11/2020 | Packer et al. | |
| 10,883,384 | B2 | 1/2021 | Heinry et al. | |
| 11,033,992 | B2 | 6/2021 | MacFarlane et al. | |
| 11,041,394 | B2 * | 6/2021 | Walston | F01D 5/284 |
| 11,149,552 | B2 | 10/2021 | DiPietro, Jr. et al. | |
| 11,236,627 | B2 | 2/2022 | Germain et al. | |
| 11,268,389 | B2 | 3/2022 | Freeman et al. | |
| 11,268,394 | B2 * | 3/2022 | Frey | F01D 9/044 |
| 11,466,580 | B2 * | 10/2022 | Underwood | F01D 5/284 |
| 11,891,912 | B2 | 2/2024 | Vadugappatty Srinivasan et al. | |
| 12,123,321 | B2 | 10/2024 | Kray et al. | |
| 12,134,583 | B2 | 11/2024 | Sudre | |
| 12,215,603 | B2 | 2/2025 | DeReimer et al. | |
| 2008/0298973 | A1 * | 12/2008 | Marini | F01D 5/147 416/223 R |
| 2014/0314549 | A1 | 10/2014 | Pakkala et al. | |
| 2015/0097023 | A1 | 4/2015 | Clement | |
| 2021/0276077 | A1 | 9/2021 | Hearon et al. | |
| 2022/0090505 | A1 | 3/2022 | Farmer et al. | |
| 2024/0287906 | A1 | 8/2024 | Van Oflen et al. | |
| 2024/0401485 | A1 | 12/2024 | Kim et al. | |
| 2025/0027416 | A1 | 1/2025 | Massaro et al. | |

* cited by examiner

ASSEMBLY FOR GAS TURBINE ENGINE

FIELD

The present disclosure relates to an assembly for a gas turbine engine including a plurality of assembly segments.

BACKGROUND

Ceramic components are being used in various applications, such as gas turbine engines. In particular, ceramic matrix composite (CMC) materials are more frequently being used for various high temperature applications. For example, because CMC materials can withstand relatively extreme temperatures, there is particular interest in replacing components within a combustion gas flow path of a gas turbine engine with components made from CMC materials. Plies of the CMC material may be laid up to form a preform component that may then undergo thermal and/or chemical processing to arrive at a component formed of a CMC material having a desired chemical composition.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
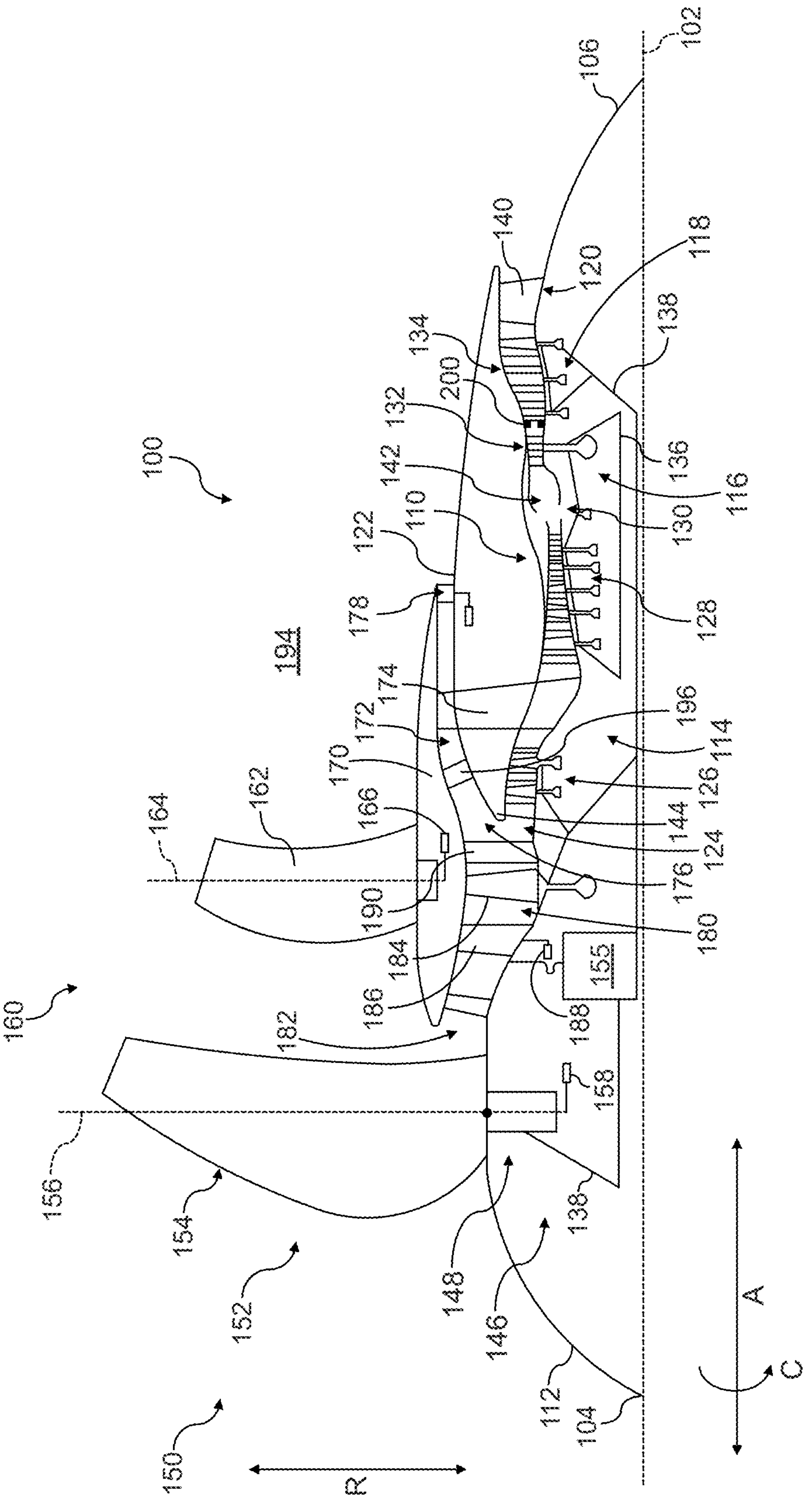
FIG. 1 is a schematic view of a gas turbine engine.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The phrases "from X to Y" and "between X and Y" each refers to a range of values inclusive of the endpoints (i.e., refers to a range of values that includes both X and Y).

As used herein, "CMC" refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3.2\ SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform.

The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer. The present disclosure is generally related to consolidating complex CMC components. Typical lay-up processes use lamination of CMC tapes onto a net shape inner mandrel to form a preform that is enlarged compared to an outer surface of a compaction tool due to layup bulk. Compaction pressure from the tool puts the preform under compressive stress, which may cause microstructural effects.

As used herein, the terms “first,” “second,” “third,” and other ordinals are used to distinguish one component from another and are not intended to signify location or importance of the individual components.

For the purposes of the description, the terms “upper,” “lower,” “right,” “left,” “vertical,” “horizontal,” “top,” “bottom,” “lateral,” “longitudinal,” and derivatives thereof shall relate to the disclosure as oriented in the drawings.

The term “single-formed” means “formed as a unitary construction” from a material with no seams, gaps, adhesives, or fasteners to join two otherwise separate parts.

The present disclosure is generally related to components for a gas turbine engine. Large ceramic components or parts with complex geometry can be difficult to fabricate in a single piece and/or at an acceptable yield. This includes CMC components as well as other ceramic materials. As such, improved methods of fabricating ceramic components are desired. Forming smaller components and then assembling these individual smaller parts can solve this problem. However, a single joining method may not provide the full range of performance needed, such as mechanical strength, hermeticity, etc. As such, improved methods of fabricating ceramic components are desired.

Forming a turbine vane frame assembly with a plurality of assembly segments allows for manufacturing of the assembly with consistent parts, improving fabrication time and reliability. Each assembly segment includes at least two components, one of which includes a band and a first vane, and the other including at least a second vane. The first and second vanes provide improved air flow from a core duct to a high pressure turbine. In particular, forming the second vane separately from the first component allows for the first component to be formed from plies of CMC material. Joining the second vane to the first component secures the position of the second vane to direct air into the high pressure turbine.

Referring now to FIG. 1, a schematic cross-sectional view of a gas turbine engine 100 is provided according to an example embodiment of the present disclosure. Particularly, FIG. 1 provides a turbofan engine having a rotor assembly with a single stage of unducted rotor blades. In such a manner, the rotor assembly may be referred to herein as an “unducted fan,” or the entire engine may be referred to as an “unducted turbofan engine.” In addition, the gas turbine engine 100 of FIG. 1 includes a third stream extending from the compressor section to a rotor assembly flowpath over the turbomachine, as will be explained in more detail below.

For reference, the gas turbine engine 100 defines an axial direction A, a radial direction R, and a circumferential direction C. Moreover, the gas turbine engine 100 defines an axial centerline 102 that extends along the axial direction A. In general, the axial direction A extends parallel to the axial centerline 102, the radial direction R extends outward from and inward to the axial centerline 102 in a direction orthogonal to the axial direction A, and the circumferential direction extends three hundred sixty degrees (360°) around the axial centerline 102. The gas turbine engine 100 extends between a forward end 104 and an aft end 106, e.g., along the axial direction A.

The gas turbine engine 100 includes a turbomachine 110, a spinner 112, and a fan section 150. Generally, the turbomachine 110 includes, in serial flow order, a compressor section 114, a combustion section 116, a turbine section 118, and an exhaust section 120. Particularly, as shown in FIG. 1, the turbomachine 110 includes a core cowl 122 that defines an annular core inlet 124. The core cowl 122 further encloses at least in part a low pressure system and a high pressure system. For example, the core cowl 122 depicted encloses and supports at least in part a booster or low pressure (“LP”) compressor 126 of the compressor section 114 for pressurizing the air that enters the turbomachine 110 through core inlet 124. A high pressure (“HP”), multi-stage, axial-flow compressor 128 of the compressor section 114 receives pressurized air from the LP compressor 126 and further increases the pressure of the air. The pressurized air stream flows downstream to a combustor 130 of the combustion section 116 where fuel is injected into the pressurized air stream and ignited to raise the temperature and energy level of the pressurized air.

It will be appreciated that as used herein, the terms “high/low speed” and “high/low pressure” are used with respect to the high pressure/high speed system and low pressure/low speed system interchangeably. Further, it will be appreciated that the terms “high” and “low” are used in this same context to distinguish the two systems, and are not meant to imply any absolute speed and/or pressure values.

The high energy combustion products flow from the combustor 130 downstream to an HP turbine 132 of the turbine section 118. The HP turbine 132 drives the HP compressor 128 through a high pressure shaft 136. In this regard, the HP turbine 132 is drivingly coupled with the HP compressor 128. The high energy combustion products then flow to an LP turbine 134 of the turbine section 118. The LP turbine 134 drives the LP compressor 126 and components of the fan section 150 through an LP shaft 138. In this regard, the LP turbine 134 is drivingly coupled with the LP compressor 126 and components of the fan section 150. The LP shaft 138 is coaxial with the HP shaft 136 in this example embodiment. After driving each of the HP and LP turbines

132, 134, the combustion products exit the turbomachine 110 through a turbomachine exhaust nozzle 140 of the exhaust section 120.

Accordingly, the turbomachine 110 defines a working gas flow path or core duct 142 that extends between the core inlet 124 and the turbomachine exhaust nozzle 140. The core duct 142 is an annular duct positioned generally inward of the core cowl 122 along the radial direction R.

The fan section 150 includes a fan 152, which is the primary fan in this example embodiment. For the depicted embodiment of FIG. 1, the fan 152 is an open rotor or unducted fan 152. In such a manner, the gas turbine engine 100 may be referred to as an open rotor engine.

As depicted, the fan 152 includes an array of fan blades 154 (only one shown in FIG. 1). The fan blades 154 are rotatable, e.g., about the axial centerline 102. As noted above, the fan 152 and the spinner 112 are drivingly coupled with the LP turbine 134 via the LP shaft 138. For the embodiments shown in FIG. 1, the fan 152 is coupled with the LP shaft 138 via a gearbox 155 that is a speed reduction gearbox, e.g., in an indirect-drive or geared-drive configuration.

It will be appreciated that the fan blades 154 may be configured to be composite fan blades, e.g., formed in whole or in part of a composite material. The term composite material as used herein may be defined as a material containing a reinforcement such as fibers or particles supported in a binder or matrix material. Composites include metallic and non-metallic composites.

Moreover, the array of fan blades 154 can be arranged in equal spacing around the axial centerline 102. Each fan blade 154 has a root and a tip and a span defined therebetween. Each fan blade 154 defines a central blade axis 156. For this embodiment, each fan blade 154 of the fan 152 is rotatable about its central blade axis 156, e.g., in unison with one another. One or more actuators 158 are provided to facilitate such rotation and therefore may be used to change a pitch of the fan blades 154 about their respective central blades' axes 156.

As depicted, it will be appreciated that the fan section 150 includes a variable pitch fan assembly 146 and a disk 148 having a plurality of disk segments arranged in a spaced apart manner. The variable pitch fan assembly 146 is coupled to the disk 148, comprising a trunnion coupled to the disk 148 and the fan blade 154. The disk 148 has a generally annular shape about the axial direction A. Further, the fan blades 154 extend outwardly from the disk 148 generally along the radial direction R. Each fan blade 154 is also rotatable relative to the disk 148 about the central blade axis 156 by virtue of the fan blades 154 being operatively coupled to the actuator(s) 158 configured to collectively vary the pitch of the fan blades 154, e.g., in unison.

The fan section 150 further includes a fan guide vane array 160 that includes fan guide vanes 162 (only one shown in FIG. 1) disposed around the axial centerline 102. For this embodiment, the fan guide vanes 162 are not rotatable about the axial centerline 102. Each fan guide vane 162 has a root and a tip and a span defined therebetween. The fan guide vanes 162 may be unshrouded, as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and, therefore, may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the gas turbine engine 100 includes both a ducted and an unducted fan which both serve to generate thrust through the movement of air without passage through at least a portion of the turbomachine 110 (e.g., without passage through the HP compressor 128 and combustion section 116 for the embodiment depicted). The ducted fan 184 is rotatable about the same axis (e.g., the axial centerline 102) as the fan blade 154. The ducted fan 184 is, for the embodiment depicted, driven by the low pressure turbine 134 (e.g., coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1) arranged in a single stage, such that the ducted fan 184 may be referred to as a single stage fan. The fan blades of the ducted fan 184 can be arranged in equal spacing around the axial centerline 102. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flow path, or simply a fan duct 172. According to this embodiment, the fan flow path or fan duct 172 may be understood as forming at least a portion of the third stream of the gas turbine engine 100.

Incoming air may enter through the fan duct 172, through a fan duct inlet 176, and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially extending, circumferentially spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The gas turbine engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. In the embodiment depicted, the inlet duct 180 is wider than the core duct 142 along the radial direction R. The inlet duct 180 is also wider than the fan duct 172 along the radial direction R.

Notably, for the embodiment depicted, the gas turbine engine 100 further includes an array of inlet guide vanes 186 positioned in the inlet duct 180 upstream of the ducted fan 184 and downstream of the engine inlet 182. The array of inlet guide vanes 186 are arranged around the axial centerline 102. For this embodiment, the inlet guide vanes 186 are not rotatable about the axial centerline 102. Each inlet guide vane 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the gas turbine engine 100 includes an array of outlet guide vanes (OGVs) 190. As with the array of inlet guide vanes 186, the array of outlet guide vanes 190 are not rotatable about the axial centerline 102. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the gas turbine engine 100 includes one or more actuators 158 for modulating the variable geometry exhaust nozzle. For example, the variable geometry exhaust nozzle may be configured to vary a total cross-sectional area (e.g., an area of the nozzle in a plane perpendicular to the axial centerline 102) to modulate an amount of thrust generated based on one or more engine operating conditions (e.g., temperature, pressure, mass flowrate, etc. of an airflow through the fan duct 172). A fixed geometry exhaust nozzle may also be adopted.

The gas turbine engine 100, as noted above includes a primary fan, or rather the fan 152 having fan blades 154, and a secondary fan, or rather the ducted fan 184 having fan blades 185. Airflow from the fan 152 is split between a bypass passage 194 and the inlet duct 180 by an inlet splitter. Airflow from the ducted fan 184 is split between the fan duct 172 and the core duct 142 by the leading edge 144 (sometimes also referred to as a fan duct splitter). The gas turbine engine 100 in such a form defines a "first" stream through the bypass passage 194, a "second" stream through the core duct 142, and a "third" stream through the fan duct 172.

Moreover, referring still to FIG. 1, in exemplary embodiments, air passing through the fan duct 172 may be relatively cooler (e.g., lower temperature) than one or more fluids utilized in the turbomachine 110. In this way, one or more heat exchangers 196 may be positioned in thermal communication with the fan duct 172. For example, one or more heat exchangers 196 may be disposed within the fan duct 172 and utilized to cool one or more fluids from the core engine with the air passing through the fan duct 172, as a resource for removing heat from a fluid, e.g., compressor bleed air, oil, or fuel.

Although not depicted, the heat exchanger 196 may be an annular heat exchanger extending substantially 360 degrees in the fan duct 172 (e.g., at least 300 degrees, such as at least 330 degrees). In such a manner, the heat exchanger 196 may effectively utilize the air passing through the fan duct 172 to cool one or more systems of the gas turbine engine 100 (e.g., lubrication oil systems, compressor bleed air, electrical components, etc.). The heat exchanger 196 uses the air passing through the fan duct 172 as a heat sink and correspondingly increases the temperature of the air downstream of the heat exchanger 196 exiting the fan exhaust nozzle 178.

The gas turbine engine 100 may include an assembly 200, such as a turbine vane frame assembly, that connects the HP turbine 132 to the LP turbine 134. The assembly 200 improves air flow from the HP turbine 132 to the LP turbine 134, described in further detail below.

It should be appreciated that the gas turbine engine 100 depicted in FIG. 1 and described herein is by way of example only, and that embodiments of the present disclosure may be incorporated in other gas turbine engines as well (such as a ducted turbofan engine).

Figure 2A:
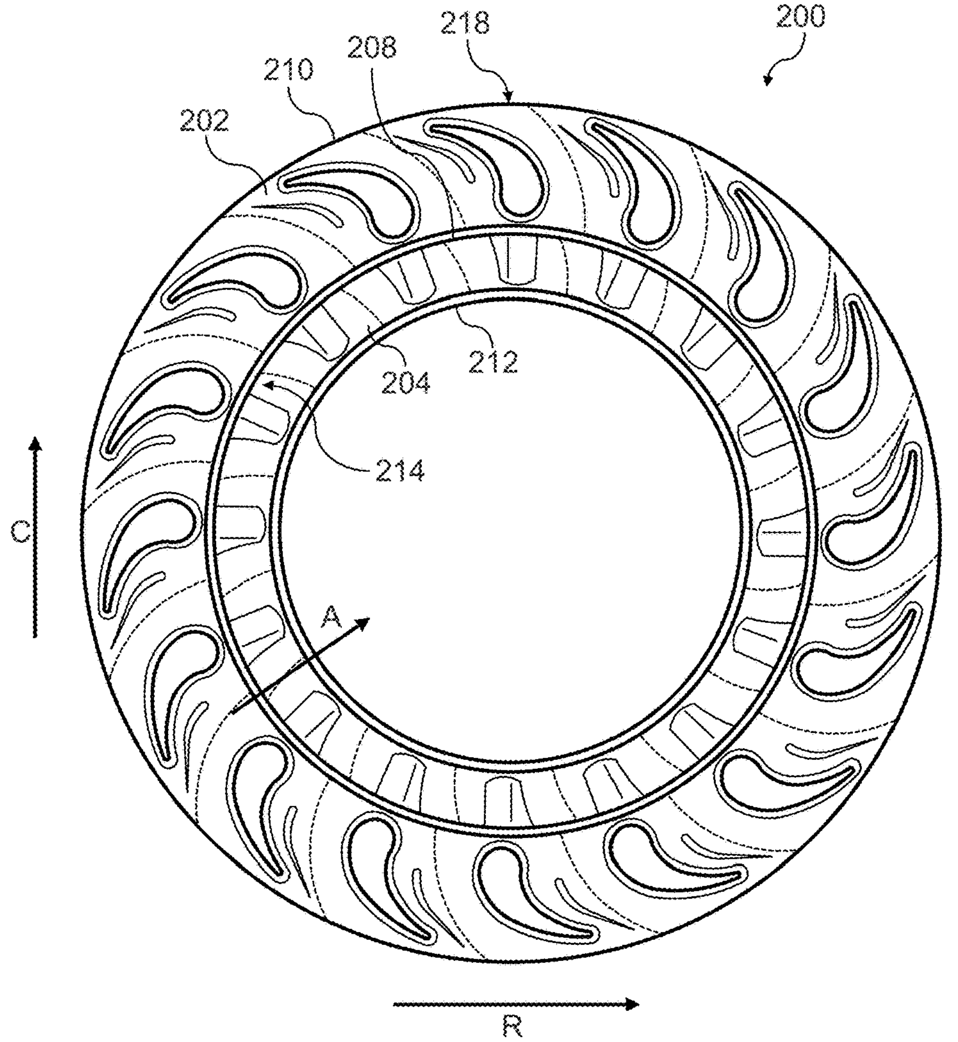
FIG. 2A is a front, schematic view of an assembly for the gas turbine engine of FIG. 1.
Figure 2B:
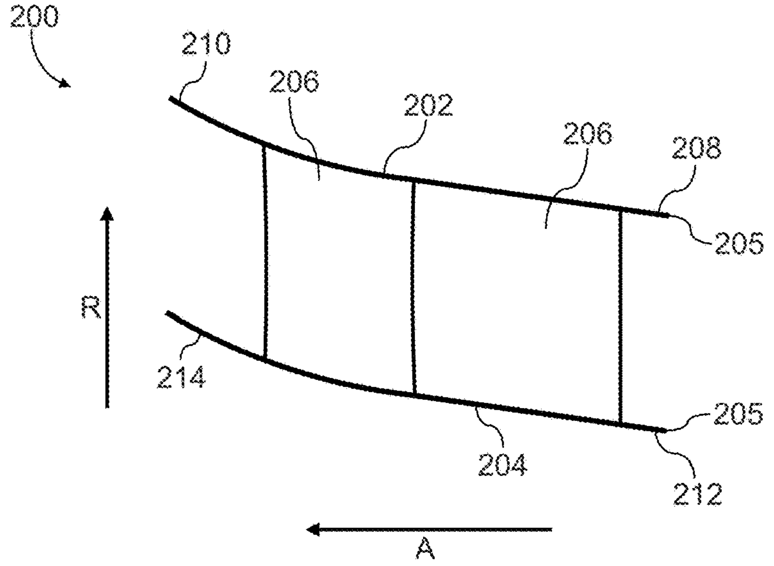
FIG. 2B is a side, cutaway view of the assembly for the gas turbine engine of FIG. 1.

Now referring to FIGS. 2A-2B, schematics view of the assembly 200 for the gas turbine engine 100 (FIG. 1) is provided. FIG. 2A is a front view of the assembly 200. FIG. 2B is a side, cutaway view of the assembly 200.

The assembly 200 is a component of the gas turbine engine 100, such as a turbine vane frame assembly that connects the HP turbine 132 (FIG. 1) to the core duct 142 (FIG. 1). Specifically, the turbine vane frame assembly is a frame attached to the HP turbine 132, acting as a nozzle for the LP turbine 134 (FIG. 1). The assembly 200 is annular, extending in a 360 degree arrangement about the axial centerline 102 (FIG. 1).

The assembly 200 includes an outer band 202, an inner band 204, and a plurality of vanes 206 extending from the outer band 202 to the inner band 204. In particular, the outer band 202 and the inner band 204 define a flowpath from the core duct 142 to the HP turbine 132. The outer band 202 defines a leading edge 208 and a trailing edge 210, and the inner band 204 defines a leading edge 212 and a trailing edge 214. The trailing edges 210, 214 of the outer band 202 and the inner band 204 may be disposed outward of the respective leading edges of the outer band 202 and the inner band 204 in the radial direction R. In particular, the trailing edges 210, 214 may be wider, narrower, or a same radial distance from each other as the leading edges 208, 212. In such a form, the inner band 204 and the outer band 202 extend outward in the radial direction R to connect the HP turbine 132 to the LP turbine 134, which are different radial distances from the axial centerline 102.

The leading edges 208, 212 of the outer band 202 and the inner band 204 form a turbine center frame 205, and the interior surfaces of the outer band 202 and the inner band 204 form a nozzle for the LP turbine 134. The turbine center frame directs air from the HP turbine 132, and the nozzle directs air into the LP turbine 134. Using the assembly 200 to form the turbine center frame and the nozzle reduces the total number of components in the gas turbine engine, addressing weight and space constraints.

The assembly 200 includes a plurality of assembly segments 218. Each assembly segment 218 is a portion of the assembly 200 joined to two adjacent ones of the plurality of assembly segments 218. In general, each of the plurality of assembly segments 218 is substantially identical to each other of the plurality of assembly segments 218, which improves manufacturing efficiency and consistency.

Additionally, forming the assembly 200 from the plurality of assembly segments 218 allows for removal of assembly segments 218 for repair and maintenance without removal of the entire assembly 200.

Figure 3:
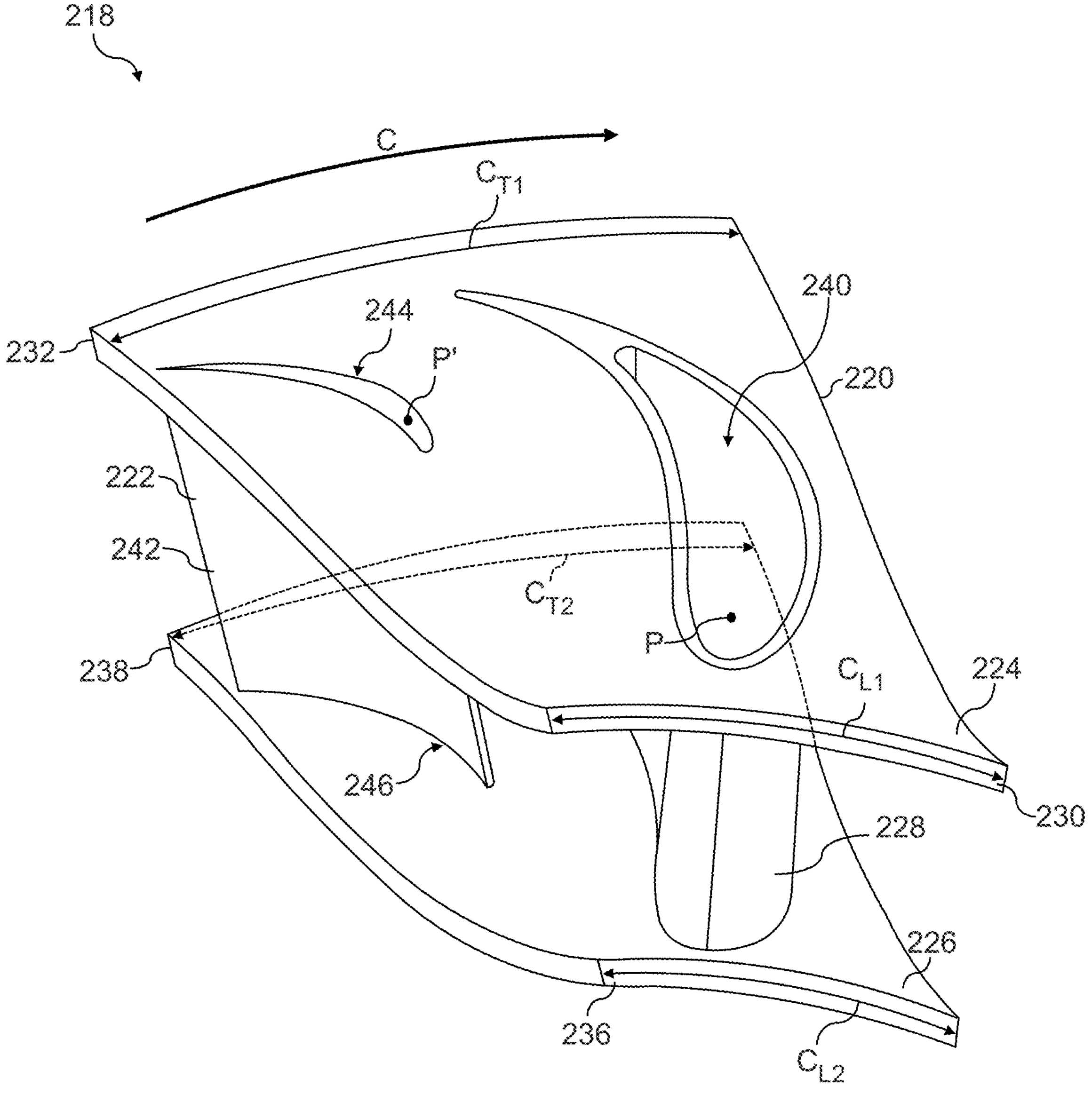
FIG. 3 is a perspective, schematic view of an assembly segment of the assembly of FIG. 2A.

With reference to FIG. 3, a schematic view of one of the plurality of assembly segments 218 is provided. The assembly segment 218 includes a first component 220 and a second component 222. The first component 220 includes a first band 224, a second band 226, and a first vane 228 (which is one of the vanes 206 (FIG. 2A). The first component 220 is single-formed, and the first band 224, the second band 226, and the first vane 228 are formed together by laying up plies of material (such as CMC) and processing the plies to form a densified part. Because the first component 220 is single-formed, lacking any gaps, seams, or fasteners, the overall strength of the first component 220 is increased.

The first band 224 is part of the outer band 202 (FIG. 2A) of the assembly 200 (FIG. 2A). Specifically, the first band 224 defines a leading edge 230 and a trailing edge 232. The leading edge 230 defines a leading circumferential length C11 and the trailing edge 232 defining a trailing circumferential length CT1. The leading circumferential length CL1 is smaller than the trailing circumferential length CT1 such that the first band 224 widens in the circumferential direction C from the leading edge 230 to the trailing edge 232.

The second band 226 is part of the inner band 204 (FIG. 2A) of the assembly 200. Specifically, the second band 226 defines a leading edge 236 and a trailing edge 238. The leading edge 236 defines a leading circumferential length CL2 and the trailing edge defining a trailing circumferential length CT2. The leading circumferential length CL2 is smaller than the trailing circumferential length CT2, such that the second band 226 widens in the circumferential direction C from the leading edge 236 to the trailing edge 238.

Each assembly segment 218 forms part of the turbine center frame and part of the nozzle. Specifically, the leading edge 230 of the first band 224 and the leading edge 236 of the second band 226 define a part of a turbine center frame, and the trailing edge 232 of the first band 224 and the trailing edge 238 of the second band 226 define a nozzle. Air flows from the HP turbine 132 (FIG. 1) through the turbine center frame to the nozzle of the LP turbine 134 (FIG. 1). In such a form, the assembly segment 218 directs air flow to the LP turbine 134, improving operation of the gas turbine engine 100 (FIG. 1).

The first vane 228 directs air along the flowpath from the turbine center frame to the nozzle. Specifically, the first vane 228 provides swirl to the air flowing from the core duct 142 (FIG. 1) to the HP turbine 132, which increases air flow through the assembly segment 218. In particular, the first vane 228 defines a slot 240 extending from the first band 224 to the second band 226, and an airfoil (not shown) may be disposed in the vane to direct the air through the assembly segment 218. The first vane 228 is pitched to a specific pitch angle relative to a pitch axis P. When the assembly segments 218 are combined into the assembly 200, the respective pitch angle of each first vane 228 of each of the plurality of assembly segments 218 is a same angle. By pitching the first vanes 228 to the same angle, the air flow is swirled consistently through the assembly 200.

The second component 222 includes a second vane 242 (which is one of the vanes 206). The second vane 242 is formed separately from the first component 220 and then provided to the first component 220 to form the assembly segment 218. Specifically, the first band 224 and the second band 226 may define voids, slots, or pockets into which the second vane 242 is placed. The second vane 242 is then secured to the first band 224 and to the second band 226. Specifically, the second vane 242 is joined to the first band 224 with a first joint 244, and the second vane 242 is joined to the second band 226 with a second joint 246. As described in further detail below, the first joint 244 and/or the second joint 246 may include one or more of a slurry, a fillet, a CMC material, or a noodle. The second vane 242 is solid, directing air through the assembly segment 218 to the HP turbine 132. The second vane 242 may be smaller than the first vane 228, such as having a shorter axial length. The second vane 242 is pitched to a second pitch angle relative to a pitch axis P', and the second pitch angle may be a same angle as the pitch angle of the first vane 228. Alternatively, the second pitch angle of the second vane 242 may differ from the pitch angle of the first vane 228.

Figure 4:
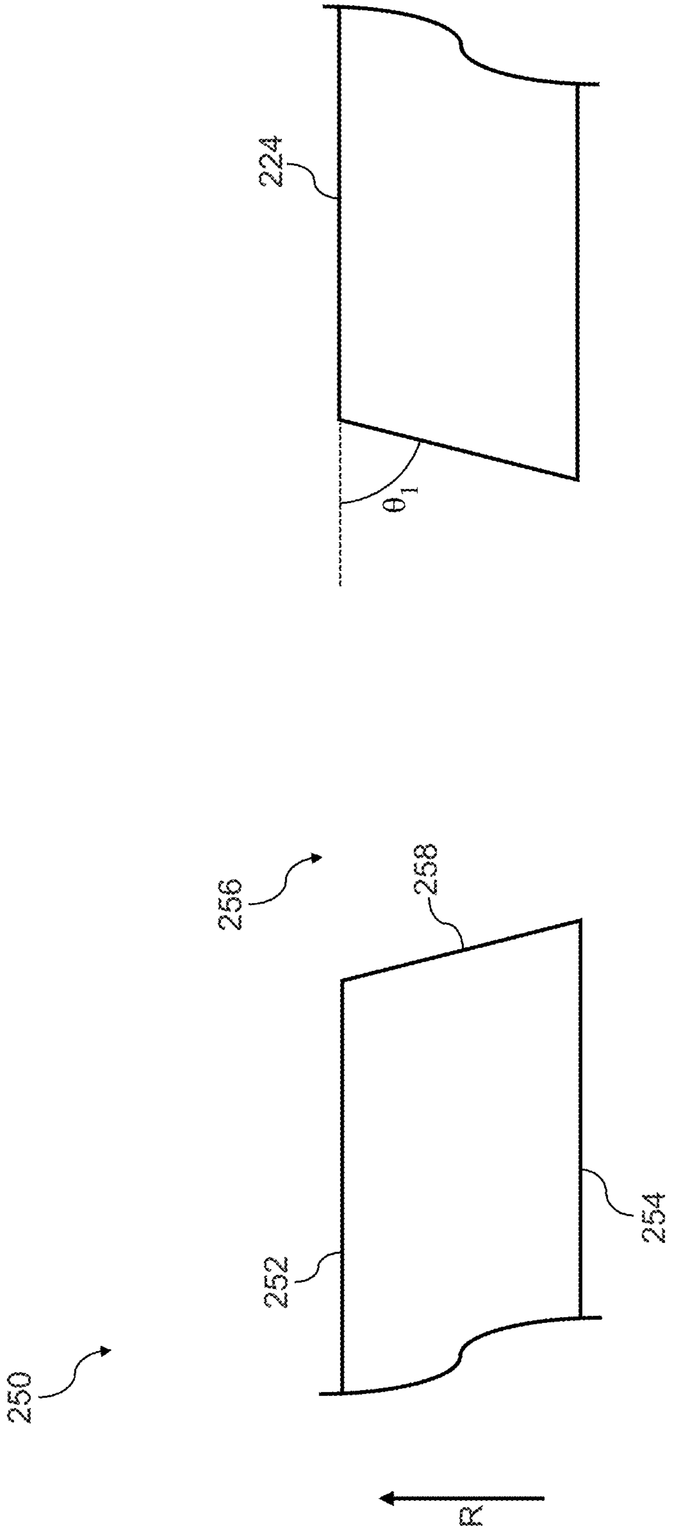
FIG. 4 is a magnified schematic view of a first band of the assembly segment of FIG. 3.

Now referring to FIG. 4, a schematic view of a band 250 of an assembly segment 218 (FIG. 2A) is provided. Specifically, FIG. 4 shows part of a first band 224 of the assembly segment 218, forming part of an outer band 202 of an assembly 200 of FIG. 2A. The band 250 defines a top surface 252 and a bottom surface 254. As described above, the terms "top" and "bottom" are defined relative to the orientation of the Figure. In FIG. 4, the top surface 252 of the band 250 is part of the outermost surface of the assembly 200 in the radial direction R, and the bottom surface 254 of the band 250 faces inward toward the inner band 204 in the radial direction R. It will be appreciated that the assembly segment 218 may take on different configurations, and similar components between the configurations shown below will use similar numerals to those of FIG. 2A.

The band 250 defines a void 256 extending from the top surface 252. In FIG. 4, the void 256 extends from the top surface 252 to the bottom surface 254, acting as a hole or funnel through which a component (such as the second vane 242 shown in FIG. 3) may be placed. The band 250 defines a tapered surface 258 facing the void 256. The tapered surface 258 extends from the top surface 252 to the bottom surface 254. In this context a "tapered" surface is a surface that defines an angle relative to the top surface 252 that is not a right angle. That is, the tapered surface 258 slopes inward or outward from the top surface 252. In FIG. 4, the tapered surface 258 defines a first angle θ1 that is less than 90 degrees relative to the top surface 252, allowing the second component 222 to be placed through the void 256 from the top surface 252 to or past the bottom surface 254. It will be appreciated that the first angle 01 may be greater than 90 degrees relative to the top surface 252, and the second component 222 may be placed through the void 256 from the bottom surface 254 to or past the top surface 252.

Figure 5:
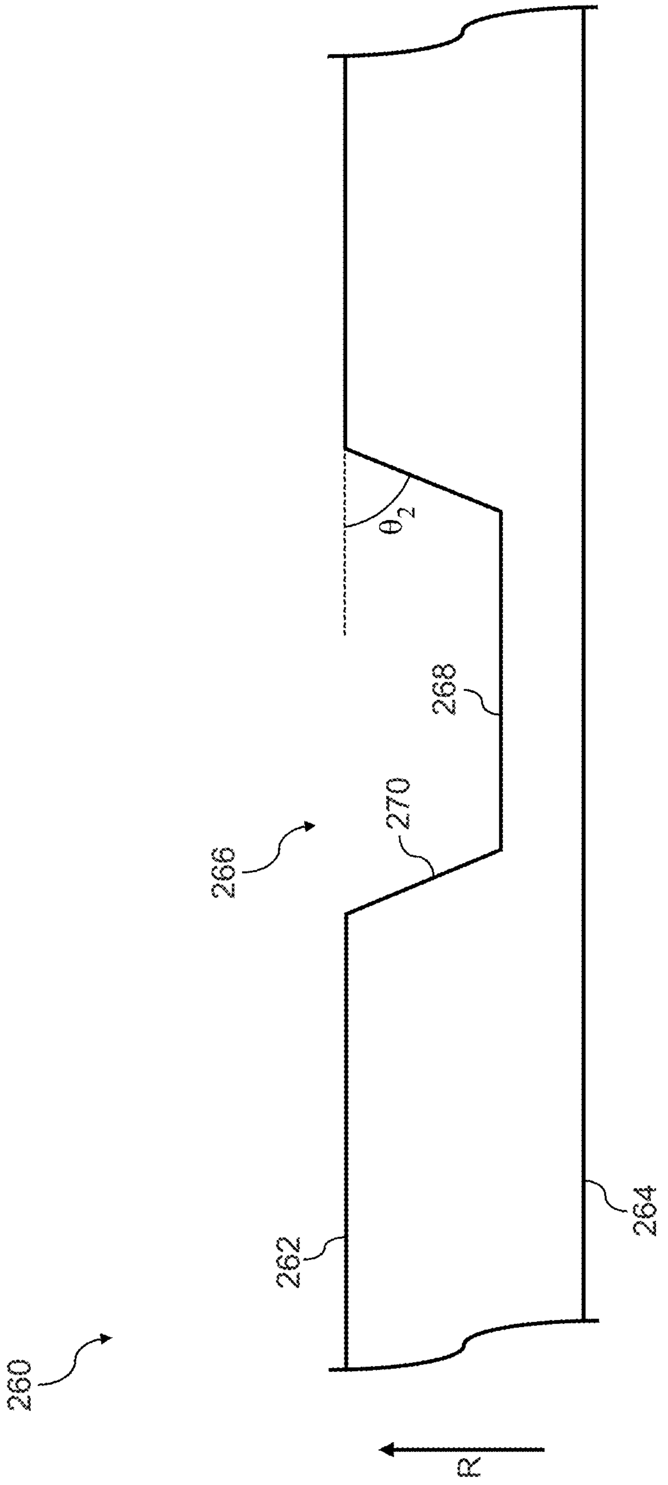
FIG. 5 is a magnified schematic view of a second band of the assembly segment of FIG. 3.

Now referring to FIG. 5, a schematic view of another band 260 of an assembly segment 218 (FIG. 2A) is provided. Specifically, FIG. 5 shows part of a second band 226 of the assembly segment 218, forming part of an inner band 204 of an assembly 200 of FIG. 2A. The band 260 defines a top surface 262, a bottom surface 264, and a void 266 extending from the top surface 262. The void 266 is a pocket that does not extend to the bottom surface 264. That is, the band 260 defines a pocket surface 268 and a tapered surface 270 extending to the pocket surface 268, the tapered surface 270 and the pocket surface 268 facing the void 266. The pocket surface 268 is spaced from the bottom surface 264 of the band 260. The second component 222 (FIG. 3) may be placed in the pocket, contacting the pocket surface 268 and the tapered surface 270.

As with the tapered surface 258 of FIG. 4, the tapered surface 270 defines a second angle $\theta_2$ with the top surface 262 that is not a right angle. The second angle $\theta_2$ may be less than 90 degrees, as shown in FIG. 5, or the second angle $\theta_2$ may be greater than 90 degrees. It will be appreciated that the second angle $\theta_2$ may be the same angle as the first angle $\theta_1$, or the second angle $\theta_2$ may be a different angle than the first angle $\theta_1$. The tapered surfaces 258, 270 reduce opportunity for bonding material (described below) to form gaps between the bands 250 (FIG. 4), 260 and the second vane 242 that may occur when the sides of the second vane 242 and/or the voids 256 (FIG. 4), 266 are straight.

Figure 6:
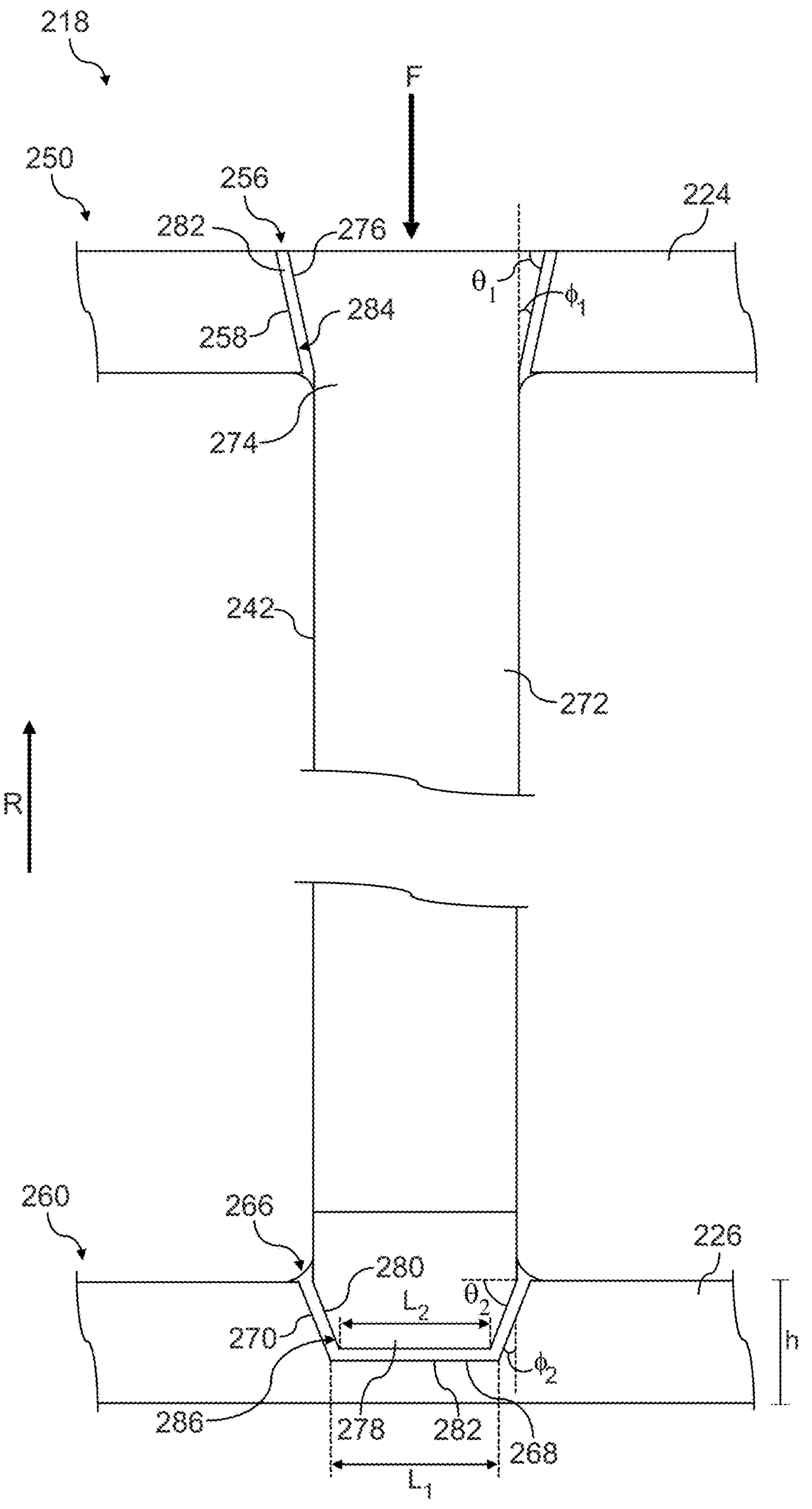
FIG. 6 is a partial schematic view of the assembly segment of FIG. 3.

With reference to FIG. 6, a schematic view of a component connected to the bands 250, 260 of FIGS. 4-5 is provided. Specifically, the component is a second vane 242 as shown in FIG. 3, and the bands 250, 260 are the first band 224 and the second band 226 as shown in FIG. 3. For clarity, the void 256 of the band 250 is a “first” void 256, and the void 266 of the band 260 is a “second” void 266. Similarly, the tapered surface 258 of the band 250 is a “first” tapered surface 258, and the tapered surface 270 of the band 260 is a “second” tapered surface 270.

The second vane 242 extends through the first and second voids 256, 266 and is joined to the first band 224 and to the second band 226. Specifically, the second vane 242 defines a base 272, a first end 274 with a first tapered edge 276 angled from the base 272, and a second end 278 with a second tapered edge 280 angled from the base 272. The base 272 extends out from the first and second voids 256, 266, such that only the first end 274 and the second end 278 are disposed in the first and second voids 256, 266. The first end 274 is disposed in the first void 256, and the first tapered edge 276 defines a first edge angle $\phi_1$ relative to the base 272. The second end 278 is disposed in the second void 266, and the second tapered edge 280 defines a second edge angle $\phi_2$ relative to the base 272. The first and second tapered surfaces 258, 270 and the first and second tapered edges 276, 280 may be shaped to mate with each other. That is, the first angle $\theta_1$ of the first tapered surface 258 may be a complimentary angle to the first edge angle $\phi_1$ of the first tapered edge 276, i.e., the first angle $\theta_1$ and the first edge angle $\phi_1$ add to 90 degrees as defined and shown in FIG. 4. Similarly, the second angle $\theta_2$ of the second tapered surface 270 may be a complimentary angle to the second edge angle $\phi_2$ of the second tapered edge 280. In such a form, the first and second tapered surfaces 258, 270 and the first and second tapered edges 276, 280 slope in the same manner to engage each other without gaps forming therebetween.

Alternatively, the angles $\theta_1$, $\theta_2$, $\phi_1$, $\phi_2$ may not be complementary or related to each other. That is, each of the angles $\theta_1$, $\theta_2$, $\theta_1$, $\theta_2$ may be determined based on other specifications, such as specified distance between the first and second tapered surfaces 258 and the first and second tapered edges 276, 280 or a specific shape. As an example, the relationship between the angles $\theta_1$, $\theta_2$, $\phi_1$, $\theta_2$ may be determined by the following expression:

$$\tan(\phi) = \frac{L_1 - L_2 + 2h\tan(\theta)}{2h},$$

where $\phi$ and $\theta$ represent the specific ones of 01, 02, $\phi_1$, $\phi_2$ corresponding to the specific end 274, 278 of the second vane 242, h is the height of the band 250, 260, $L_1$ is the length of the first or second void 256, 266 at pocket surface 268, and $L_2$ is the length of first or second end 274, 278 at the point of contact with the pocket surface 268.

The assembly segment 218 includes a bonding material 282 disposed in the first and second voids 256, 266. The bonding material 282 is a paste or slurry densified by melt infiltration of silicon or silicon alloy to form a reaction bonded silicon carbide material. The bonding material 282 can include ceramics, glasses, metals, intermetallic compounds, or combinations thereof. Such combinations may include, but are not limited to, silicon carbide, silicon nitride, boron carbide, aluminum nitride, silicon oxynitride, titanium diboride, zirconium diboride, hafnium diboride, aluminum oxide, zirconium oxide, aluminosilicates, silica glasses, lithium aluminosilicate glass-ceramic, calcium aluminosilicate glass-ceramic, magnesium aluminosilicate glass-ceramic, aluminum phosphate, titanium and titanium alloy, zirconium and zirconium alloy.

The bonding material 282 can be monolithic or reinforced with a reinforcing agent, such as milled fibers or chopped fibers, that may be formed of a combination of materials, such as silicon carbide fibers and/or carbon fibers. Such fibers may be included in a range from 3 volume % to 50 volume % of the total volume of the bonding material 282. The bonding material 282 may be fabricated by introducing a carbon precursor material in the form of a slurry and performing one or more thermal treatments to densify the bonding material 282. The thermal treatments may include one or more of a drying step, a curing step, or a pyrolysis step. Following the thermal treatments, the bonding material 282 may undergo densification by melt infiltration of a silicon or silicon alloy into the bonding material 282. During densification, the silicon or silicon alloy reacts with the carbon to form a reaction bonded silicon carbide material. In such a form, the paste or slurry may contain ceramic powders like silicon carbide powder of one or more sizes (such as a plurimodal particle size distribution) to improve powder packing, one or more carbon sources such as carbon black powder, or a material that converts to carbon by a pyrolysis treatment. Such materials may include a phenolic resin, a furan or furfuryl alcohol resin, a binder like polyvinyl butyral (PVB), a plasticizer like triethylene Glycol Bis (2-EthylHexanoate), or a liquid carrier like furfuryl alcohol. In general, the bonding material 282, following a heat treatment process, has a microstructure that is substantially free of cracks, unreacted carbon, and excess free silicon, improving the mechanical structure of the components joined by the bonding material 282.

Specifically, the first band 224, the first end 274 of the second vane 242, and the bonding material 282 define a first bonding interface 284 that is free of gaps, and the second band 226, the second end 278 of the second vane 242, and the bonding material 282 define a second bonding interface 286 that is free of gaps. In particular, the bonding material 282 extends from the pocket surface 268 and the tapered surface 270 of the second band 226 to the second end 278 of the second vane 242. The bonding material 282 secures the second end 278 of the second vane 242 to the pocket surface 268 and to the tapered surface 270. Additionally, the bonding material 282 extends from the first tapered surface 258 to the first tapered edge 276 of the first end 274 of the second vane 242.

To form the first and second bonding interfaces 284, 286 to be free of gaps, a force F is applied to the second vane 242 to press the first and second tapered edges 276, 280 against the bonding material 282. The force F spreads the bonding material 282 through the first and second voids 256, 266, filling the remaining space or gaps between the first and second tapered edges 276, 280 and the first and second tapered surfaces 258, 270. The force F applied may be determined to spread the bonding material 282 without pushing the bonding material 282 out from the first and second voids 256, 266. In particular, the force F may be applied during a post-assembly thermal process, such a curing and/or drying step, to control shrinkage of the bonding material 282 and/or porosity from entrapped gases and/or heterogeneity of material compositions, inhibiting the formation of the gaps into which silicon veins may form.

In the form shown, each of the first band 224, the second band 226, and the second vane 242 is a densified part formed of CMC. It will be appreciated that at least one of the first band 224, the second band 226, or the second vane 242 may be a "green" part, i.e., formed from CMC but not densified. It will also be appreciated that at least one of the first band 224, the second band 226, or the second vane 242 may be ceramic.

Figure 7:
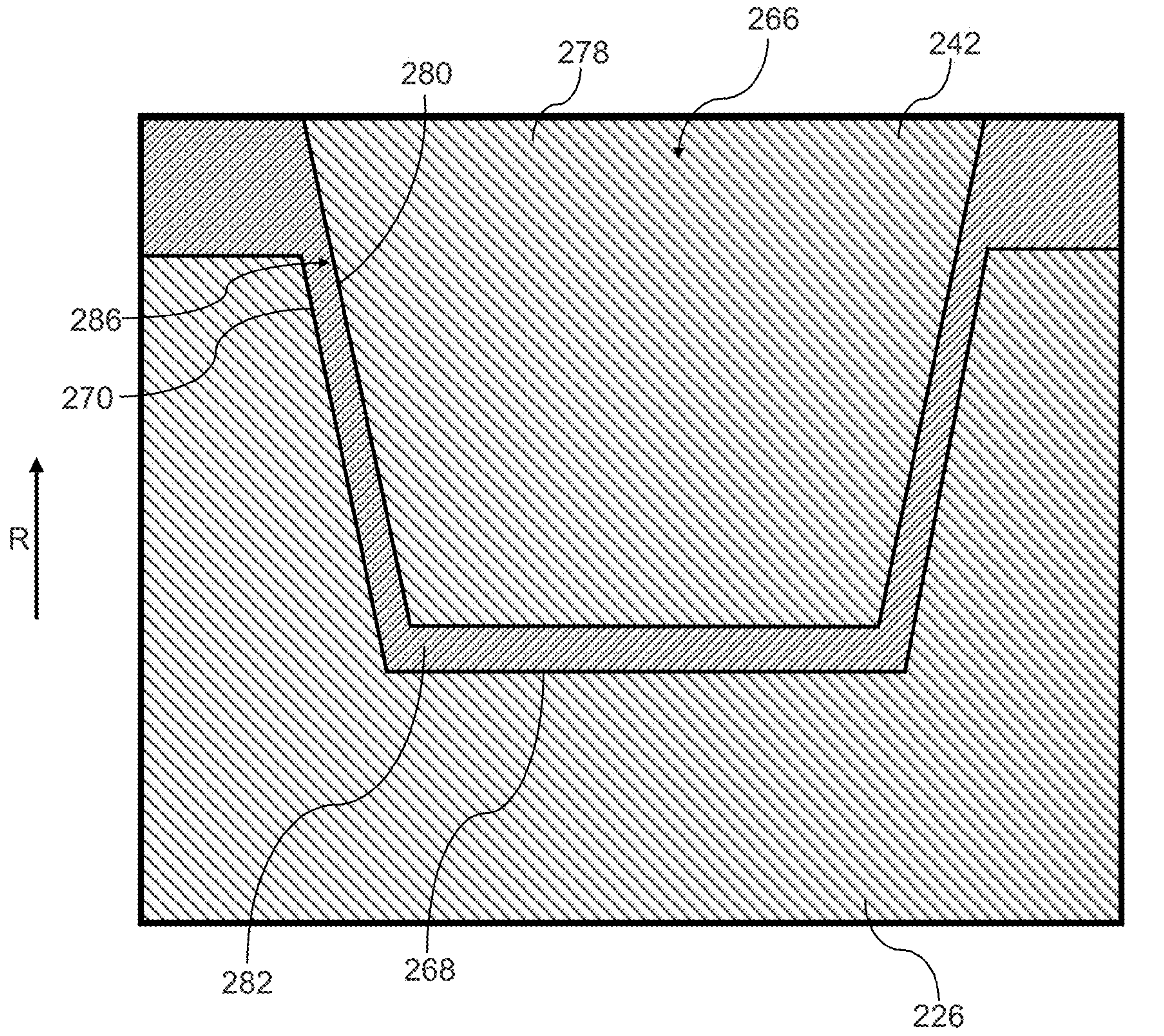
FIG. 7 is a magnified, cross-sectional view of a vane joined to the second band of the assembly segment of FIG. 3.

With reference to FIG. 7, a cross-sectional view of the second bonding interface 286 is provided. As described above, the second bonding interface 286 includes the second end 278 of the second vane 242, the second void 266 of the second band 226, and the bonding material 282. In FIG. 7, the second vane 242 is processed such that the bonding material 282 is solid. Because the bonding material 282 extends along the second tapered surface 270, the pocket surface 268, and the second tapered edge 280, no gaps are formed that lack bonding material 282. In particular, when gaps form along the second tapered surface 270, the pocket surface 268, or the second tapered edge 280 from incomplete spreading and/or shrinking of the bonding material 282, the gaps are filled by silicon during the melt infiltration step to form silicon veins along the second tapered surface 270 and/or the pocket surface 268 and/or along the second tapered edge 280. In this context, the silicon veins are "along" the second tapered surface 270 and/or the pocket surface 268 and/or along the second tapered edge 280 when the silicon veins are parallel or substantially parallel to the second tapered surface 270 and/or the pocket surface 268 and/or along the second tapered edge 280. In such a form, the silicon veins reduce overall strength of the second bonding interface 286 because the silicon alone has lower mechanical strength than the bonding material 282. Alternatively, when the gaps are not filled with silicon, the gaps may reduce the overall strength of the bonding interface. By applying the force F during the curing step and/or the drying step, such gaps are reduced or inhibited form forming.

Figure 8:
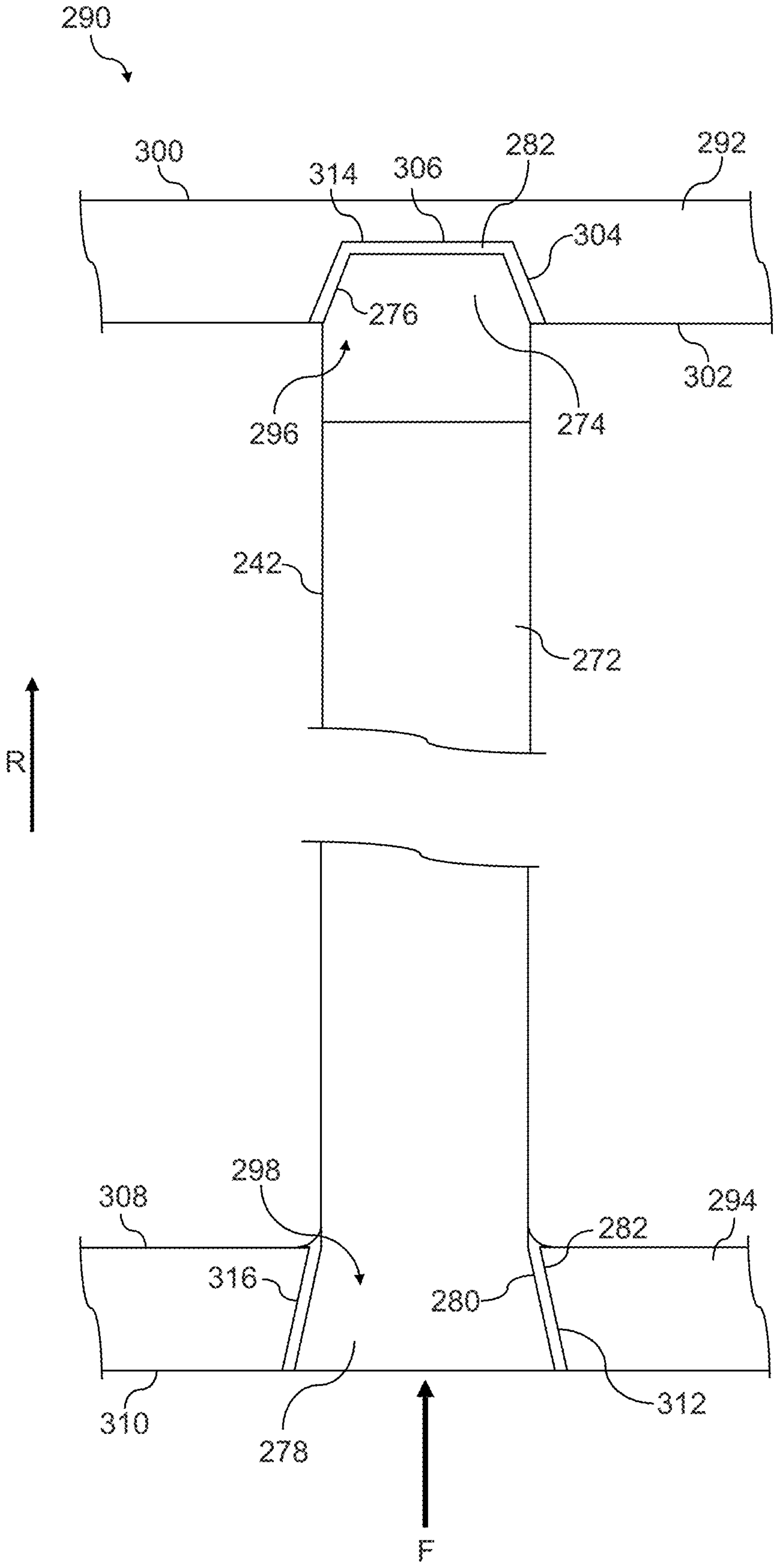
FIG. 8 is another partial schematic view of the assembly segment of FIG. 3.

Now referring to FIG. 8, a schematic view of another assembly segment 290 is provided. The assembly segment 290 includes a second vane 242 connected to a first band 292 and a second band 294. The first band 292 defines a first void 296 that is a pocket, and the second band 294 defines a second void 298 that is a funnel. That is, the first band 292 defines a top surface 300, a bottom surface 302, a first tapered surface 304 extending upward from the bottom surface 302, and a pocket surface 306 that is spaced from the top surface 300. The second band 294 defines a top surface 308, a bottom surface 310, and a second tapered surface 312 angled relative to the top surface 308 that extends to the bottom surface 310. The second vane 242 includes a base 272, a first end 274 disposed in the first void 296, and a second end 278 disposed in the second void 298. The first end 274 defines a first tapered edge 276 angled relative to the base 272, and the second end 278 defines a second tapered edge 280 angled relative to the base 272. The first end 274 is disposed in the pocket, and the second end 278 is disposed through the second band 294.

A force F is applied to the second end 278 of the second vane 242 to spread bonding material 282 through the first and second voids 296, 298. In such a form, the bonding material 282 spreads along the first and second tapered surfaces 304, 312 and the pocket surface 306 to form a first bonding interface 314 and a second bonding interface 316. The first and second bonding interfaces 314, 316 are free of gaps. It will be appreciated that the assembly segment 290 of FIG. 8 is a reversed orientation of the assembly segment 218 of FIG. 6.

Figure 9:
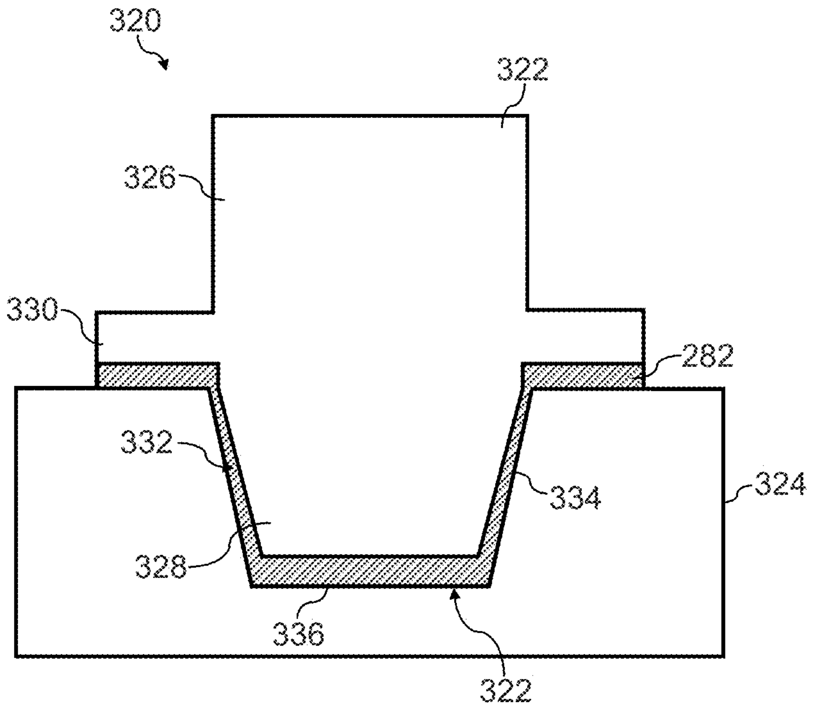
FIG. 9 is a partial schematic view of another assembly segment.

With reference to FIG. 9, a schematic view of another assembly segment 320 is provided. The assembly segment 320 includes a vane 322 and a band 324. The vane 322 includes a base 326, an end 328, and a flange 330. The band 324 defines a void 332 with a tapered surface 334 and a pocket surface 336. A bonding material 282 extends between the flange 330 and an upper surface of the band 324 and from the end 328 to the tapered surface 334 and to the pocket surface 336. In such a form, the flange 330 provides additional bonding between vane 322 and the band 324.

Figure 10:
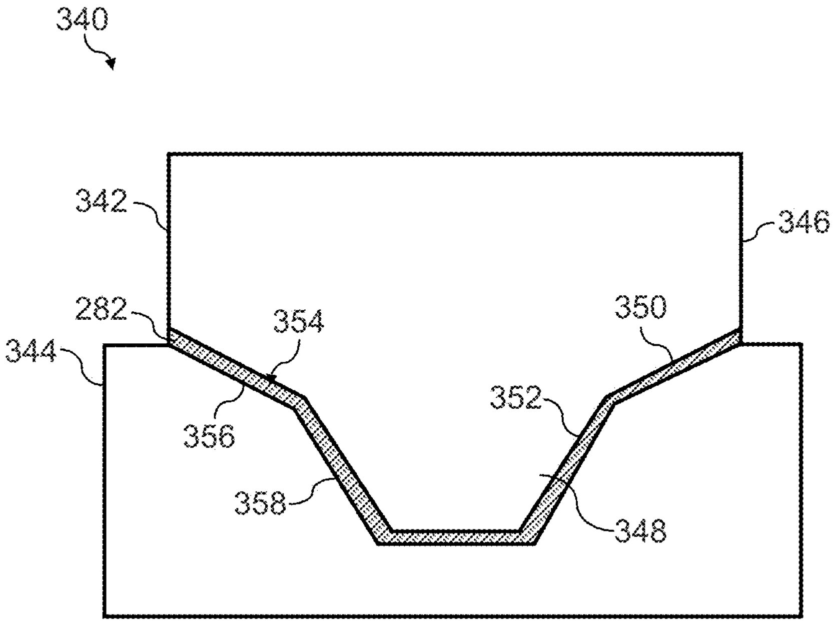
FIG. 10 is a partial schematic view of another assembly segment.

With reference to FIG. 10, a schematic view of another assembly segment 340 is provided. The assembly segment 340 includes a vane 342 and a band 344. The vane 342 includes a base 346 and an end 348, the end 348 defining a first tapered edge 350 and a second tapered edge 352. The band 344 defines a void 354 defining a first tapered surface 356 and a second tapered surface 358. A bonding material 282 joins the first tapered surface 356 to the first tapered edge 350 and the second tapered surface 358 to the second tapered edge 352.

Figure 11:
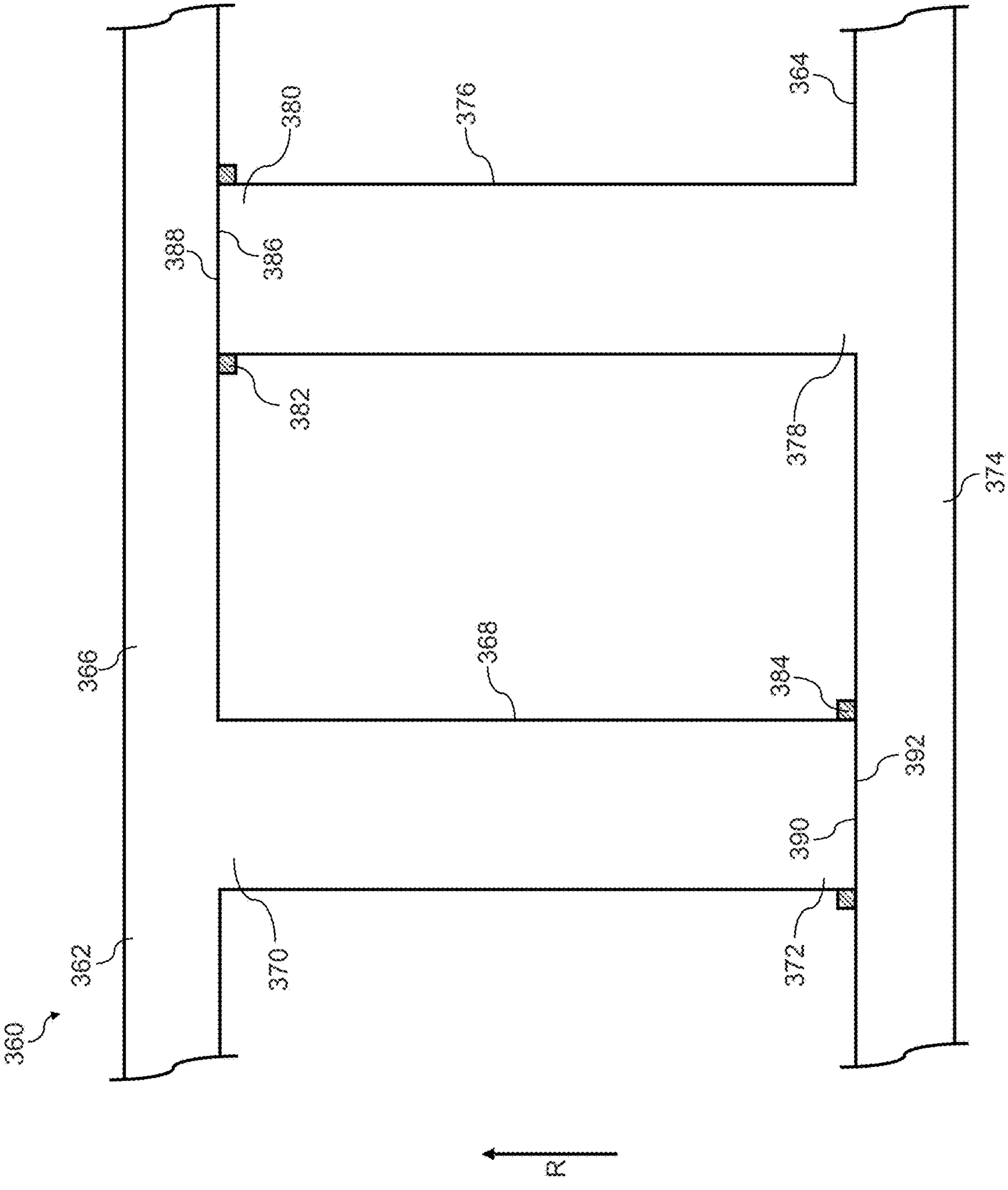
FIG. 11 is a schematic view of another assembly segment.

With reference to FIG. 11, a schematic view of another assembly segment 360 is provided. The assembly segment 360 includes a first component 362 and a second component 364. The first component 362 and the second component 364 are joined together to form the assembly segment. In the orientation shown in FIG. 11, the first component 362 is outward in the radial direction R relative to the second component 364.

The first component 362 includes a first band 366 and a first vane 368 extending from the first band 366. In particular, the first vane 368 is cantilevered from the first band 366, such that the first vane 368 defines a first end 370 adjacent to the first band 366 and a second end 372 that is free. The first band 366 and the first vane 368 are single-formed, as described above. For example, the first band 366 and the first vane 368 may be formed by laying up plies of CMC and then densified. In FIG. 11, the first component 362 forms part of the outer band 202 of the assembly 200 (FIG. 2A).

The second component 364 includes a second band 374 and a second vane 376 extending from the second band 374. In particular, the second vane 376 is cantilevered from the second band 374, such that the second vane 376 defines a first end 378 adjacent to the second band 374 and a second end 380 that is free. The second band 374 and the second vane 376 are single-formed. In FIG. 11, the second component 364 forms part of the inner band 204 of the assembly 200 (FIG. 2A).

The first component 362 and the second component 364 are joined to each other with a first joint 382 and a second joint 384. Specifically, the second vane 376 is joined to the first band 366 with the first joint 382, and the first vane 368 is joined to the second band 374 with the second joint 384. The first and second joints 382, 384 are any suitable securing feature to join the first and second components 362, 364 together, such as a slurry, a fillet, a cap, a noodle, or combinations thereof.

The first joint 382 secures the second end 380 of the second vane 376 to the first band 366. Specifically, the second end 380 of the second vane 376 has a top surface 386, the first band 366 defines a bottom surface 388, and the bottom surface 388 of the first band 366 is joined to the top surface 386 of the second end 380 of the second vane 376 with the first joint 382. Similarly, the second end 372 of the first vane 368 defines a bottom surface 390, the second band 374 defines a top surface 392, and the bottom surface 390 of the second end 372 of the first vane 368 is joined to the top surface 392 of the second band 374 with the second joint 384. In such a form, the first band 366 and the second band 374 lack voids into which the first vane 368 and the second vane 376 may be disposed.

Alternatively, not shown in the FIGS., to join the first and second components 362, 364, the first band 366 may define a first void and the second band 374 may define a second void. The second vane 376 is disposed in the first void, and the first vane 368 is disposed in the second void. In one form, the first and second voids are pockets. It will be appreciated that the pockets may include tapered surfaces as shown in FIGS. 5-10. In such a form, the first joint 382 may include a bonding material disposed in the first void extending from the second band 374 to the second end 372 of the first vane 368, and the second joint 384 may include the bonding material disposed in the second void extending from the first band 366 to the second end 380 of the second vane 376.

Figure 12:
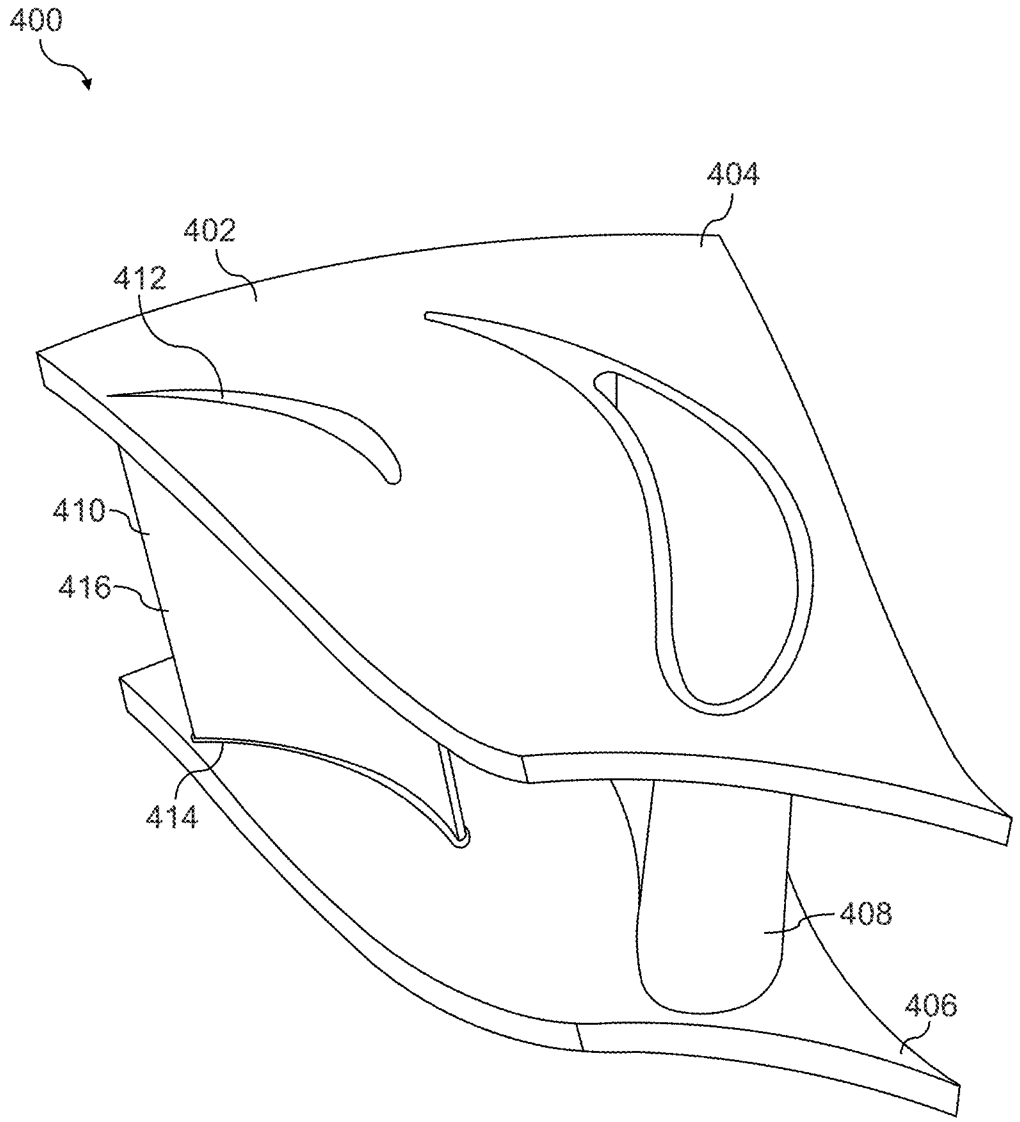
FIG. 12 is a perspective schematic view of another assembly segment with a fillet.

With reference to FIG. 12, a perspective view of an assembly segment 400 is provided. The assembly segment 400 includes a first component 402 including a first band 404, a second band 406, and a first vane 408, and a second component 410 including a second vane 412. The second component 410 is joined to the first component 402 at least partially with a fillet 414. Specifically, the second vane 412 defines an outer surface 416, and the outer surface 416 defines a perimeter, and the fillet 414 extends around the perimeter of the outer surface 416 of the second vane 412. By extending around the perimeter of the outer surface 416, the fillet 414 secures the second vane 412 to the second band 406.

Figure 13C:
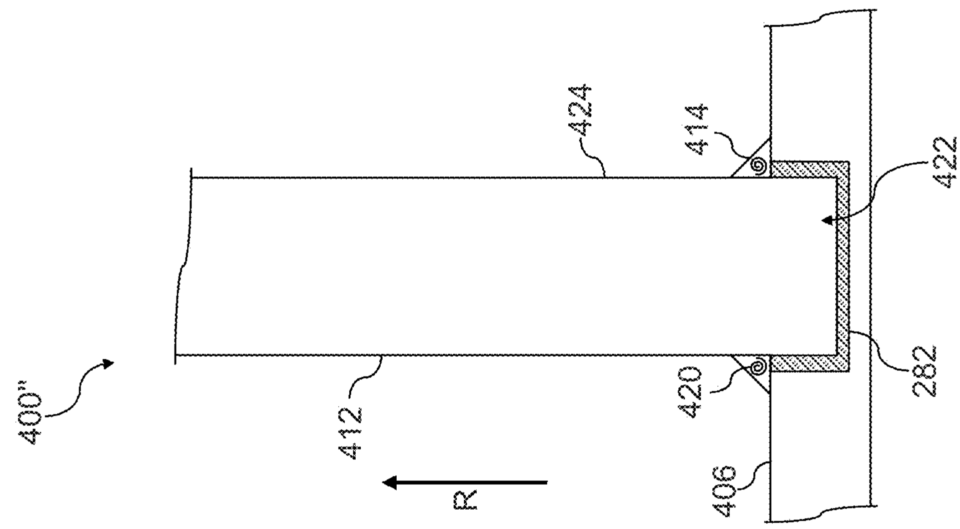
FIG. 13C is a partial schematic view of the assembly segment of FIG. 12 with a fillet that is a noodle.
Figure 13B:
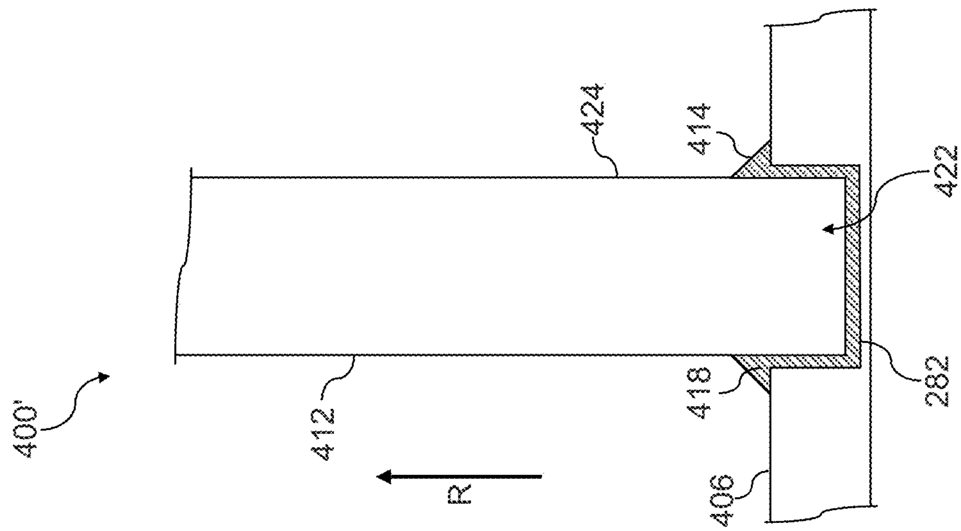
FIG. 13B is a partial schematic view of the assembly segment of FIG. 12 with a fillet that is a slurry.
Figure 13A:
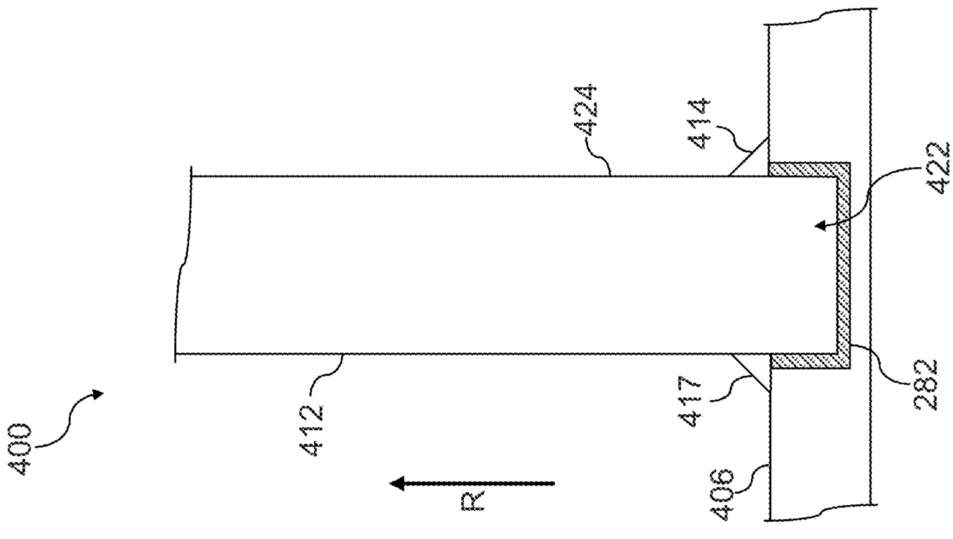
FIG. 13A is a partial schematic view of the assembly segment of FIG. 12 with a fillet that is CMC.

Now referring to FIGS. 13A-13C, schematic views of exemplary assembly segments 400, 400', 400 " are provided. FIG. 13A is a view of an assembly segment 400 with a vane 412 joined to a band 406 with a fillet 414 formed of CMC 417. FIG. 13B is a view of an assembly segment 400' with a vane 412 joined to a band 406 with a fillet 414 formed of a slurry 418. FIG. 13C is a view of an assembly segment 400" with a vane 412 joined to a band 406 with a fillet 414 formed of a noodle 420.

As described above and shown in FIG. 12, the assembly segment 400 includes the second vane 412 that is joined to the second band 406. For the purposes of FIGS. 13A-13C, the second vane 412 is generally referred to as a "vane" 412 and the second band 406 is generally referred to as a "band" 406 because it will be appreciated that the assembly segment 400, 400', 400" may include other vanes and bands that are joined together. The assembly segment 400, 400', 400" includes a fillet 414 that fixes the vane 412 to the band 406. In this context, a "fillet" 414 is a joint that is shaped with a sloped surface to connect the vane 412 to the band 406. The sloped surface improves aerodynamic performance by allowing air to flow past the fillet 414 without being interrupted by sharp corners or edges and reduces stress concentration in the joint area between the vane 412 and the band 406. The fillet 414 is outward of the pocket in a radial direction R, securing the vane 412 to the band 406.

The vane 412 is joined to the band 406 with a bonding material, such as the bonding material 282 described above. Specifically, the band 406 defines a void 422, and the vane 412 defines a side surface 424. The vane 412 is placed into the void 422, and the bonding material 282 extends from the band 406 to the vane 412, filling any gaps between the vane 412 and the band 406. The void 422 in FIGS. 13A-13C is shown with straight sides, and it will be appreciated that the void 422 be tapered as shown in FIGS. 5-10.

As shown in FIG. 13A, the fillet 414 may be a CMC material 417. As described above, the vane 412 and the band 406 may be CMC 417, and forming the fillet 414 from CMC 417 provides a common material with similar material strength to form the joint. The vane 412 and the band 406 may be green prior to being joined with the fillet 414, and then the vane 412, the band 406, and the fillet 414 may be processed together. In such a form, the vane 412, the band 406, and the fillet 414 become unitary. Alternatively, one or more of the vane 412 or the band 406 may be densified, and the fillet 414 may be applied to the densified vane 412 and/or band 406. In such a form, the fillet 414 is not single-formed with the previously densified one of the vane 412 and/or band 406 and becomes unitary with the green one of the vane 412 and/or band 406, if present.

As shown in FIG. 13B, the fillet 414 may be a slurry 418 of the bonding material 282. As described above, the bonding material 282 may be a slurry with or without chopped or milled fibers, and the fillet 414 may be formed of the same bonding material 282 as used to join the band 406 and the vane 412. After the band 406 and the vane 412 are joined with the bonding material 282, additional slurry 418 is applied to the interface between the vane 412 and the band 406 in the shape of a fillet 414. The fillet 414 is processed, curing the slurry 418 to bond the vane 412 to the band 406. Alternatively, the fillet 414 may be formed of a slurry 418 that differs from the bonding material 282 used to join the band 406 and the vane 412.

As shown in FIG. 13C, the fillet 414 may be a noodle 420. In this context, a "noodle" 420 is a ply of a material, such as CMC, rolled into a cylindrical shape that is wrapped around the interface between the vane 412 and the band 406. The noodle 420 is formed into a shape of a fillet 414 and then densified to join the vane 412 and the band 406. As an example, the ply may be placed into a noodle press to form the noodle 420. The noodle 420 may be the same material as the CMC used to form the vane 412 and the band 406. Alternatively, the noodle 420 may be a different material than the CMC used to form the vane 412 and the band 406.

While the fillet 414 is shown with a straight edge, it will be appreciated that the fillet may have a concave or convex edge. The curvature of a concave edge and a convex edge may reduce stress concentration and/or improve aerodynamic performance. The fillet 414 may be formed with the concave or convex edge by extruding the material (such as CMC material 417 or the slurry 418) and then shaped with an appropriate shaping tool, such as a caulk spreader spatula or a curved press. The fillet 414 may then undergo a thermal treatment before removing the shaping tool.

Figure 14:
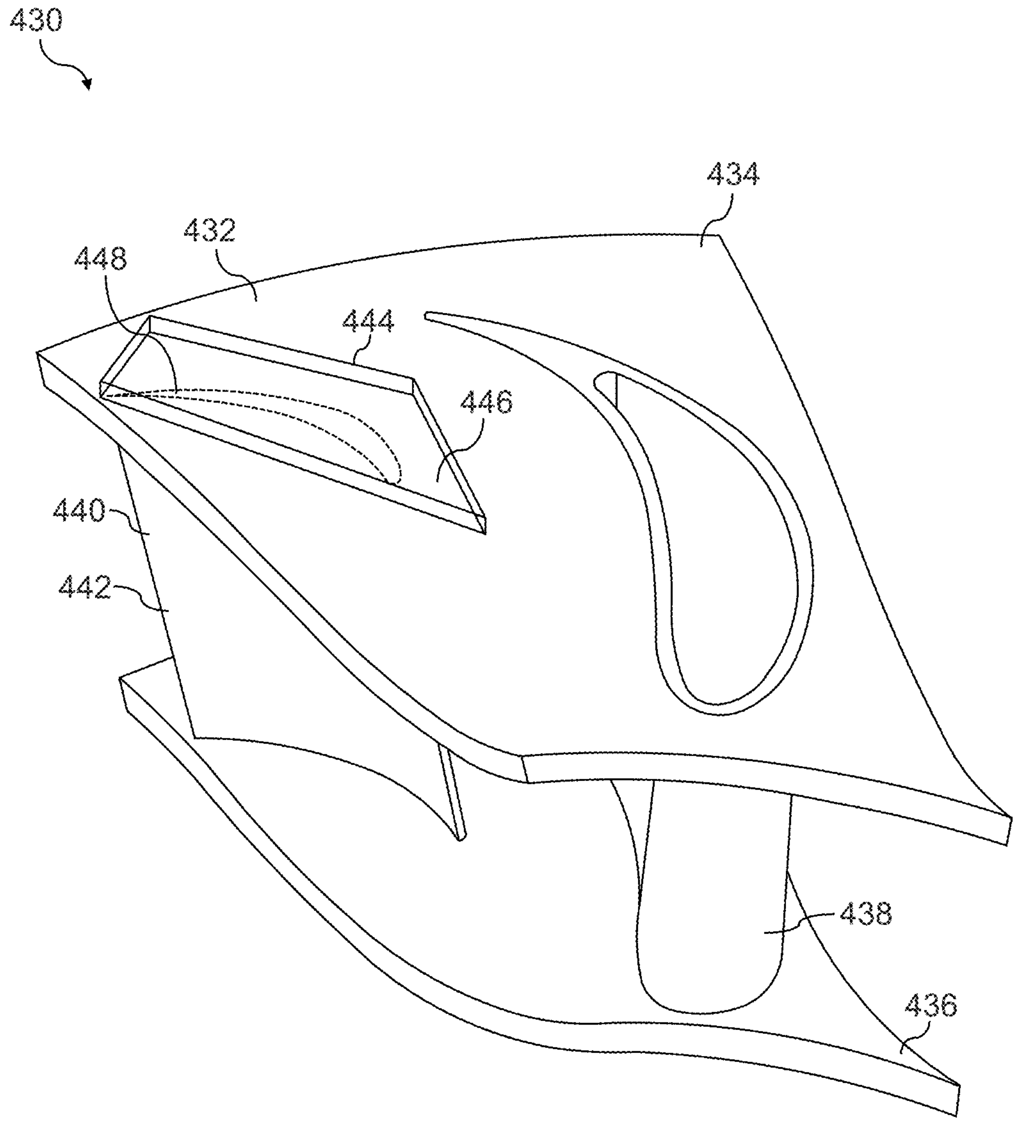
FIG. 14 is a perspective schematic view of another assembly segment with a cap.

With reference to FIG. 14, a perspective view of an assembly segment 430 is provided. The assembly segment 430 includes a first component 432 including a first band 434, a second band 436, and a first vane 438, and a second component 440 including a second vane 442. The assembly segment 430 includes a cap 444 secured to the second vane 442 and to the first band 434. The cap 444 is a piece of material that is joined to both the second vane 442 and to the first band 434 to secure the first and second components 432, 440 together. Specifically, the cap 444 defines a bottom surface 446 with a surface area, and the second vane 442 defines a top surface 448 with a surface area, and the surface area of the bottom surface 446 of the cap 444 is larger than the surface area of the top surface 448 of the second vane 442. The surface area of the bottom surface 446 of the cap 444 is determined to provide the mechanical strength to hold the second vane 442 to the first band 434. The cap 444 may have a polygonal shape, such as a quadrilateral shown in FIG. 14, or the cap 444 may have a different shape, such as a circle, an ellipse, or another shape.

Figure 15:
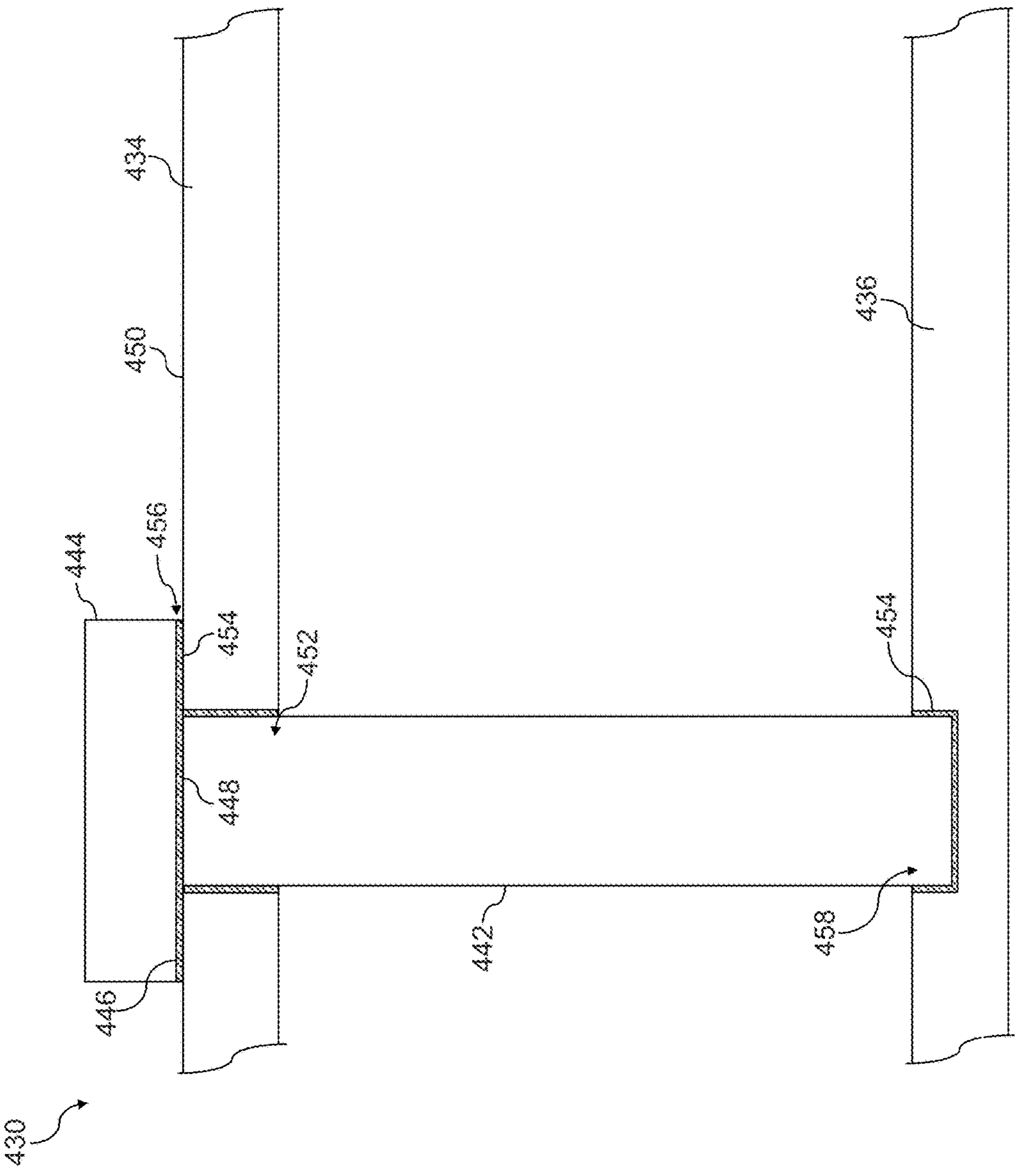
FIG. 15 is a partial schematic view of the assembly segment of FIG. 14.

With reference to FIG. 15, a schematic view of the assembly segment 430 of FIG. 14 is provided. The second vane 442 is joined to the first band 434 with the cap 444. Specifically, the first band 434 defines a top surface 450, and the cap 444 defines a bottom surface 446 connected to the top surface 450. The first band 434 defines a first void 452, and the second vane 442 is disposed in the first void 452. In particular, the second vane 442 defines a top surface 448, and the second vane 442 is disposed in the first void 452 such that the top surface 448 of the second vane 442 is flush with the top surface 450 of the first band 434. The bottom surface 446 of the cap 444 is secured to the top surface 450 of the first band 434 and the top surface 448 of the second vane 442. The first void 452 of FIG. 15 is shown with straight sides, and it will be appreciated that the first void 452 may be a funnel as shown in FIGS. 4 and 6.

To secure the cap 444 to the first band 434 and to the second vane 442, the assembly segment 430 may include a bonding material 454 disposed between the cap 444, the first band 434, and the second vane 442. The bonding material 454 may be a slurry, as described above. The bonding material 454, the bottom surface 446 of the cap 444, the top surface 450 of the first band 434, and the top surface 448 of the second vane 442 define a bonding interface 456 that is free of gaps. In such a form, the bonding interface secures the cap 444 to the first band 434 and to the second vane 442.

The second vane 442 extends from the first band 434 to the second band 436, where the second band 436 defines a second void 458 in which the second vane 442 is disposed. Specifically, the second void 458 may be a pocket, and the second vane 442 is disposed in the pocket. The bonding material 454 may be disposed in the pocket and may extend from the second band 436 to the second vane 442, securing the second vane 442 to the pocket. The second void 458 may have straight sides as shown in FIG. 15, and it will be appreciated that the second void 458 may have a tapered surface as shown in FIGS. 5-10.

Figure 16:
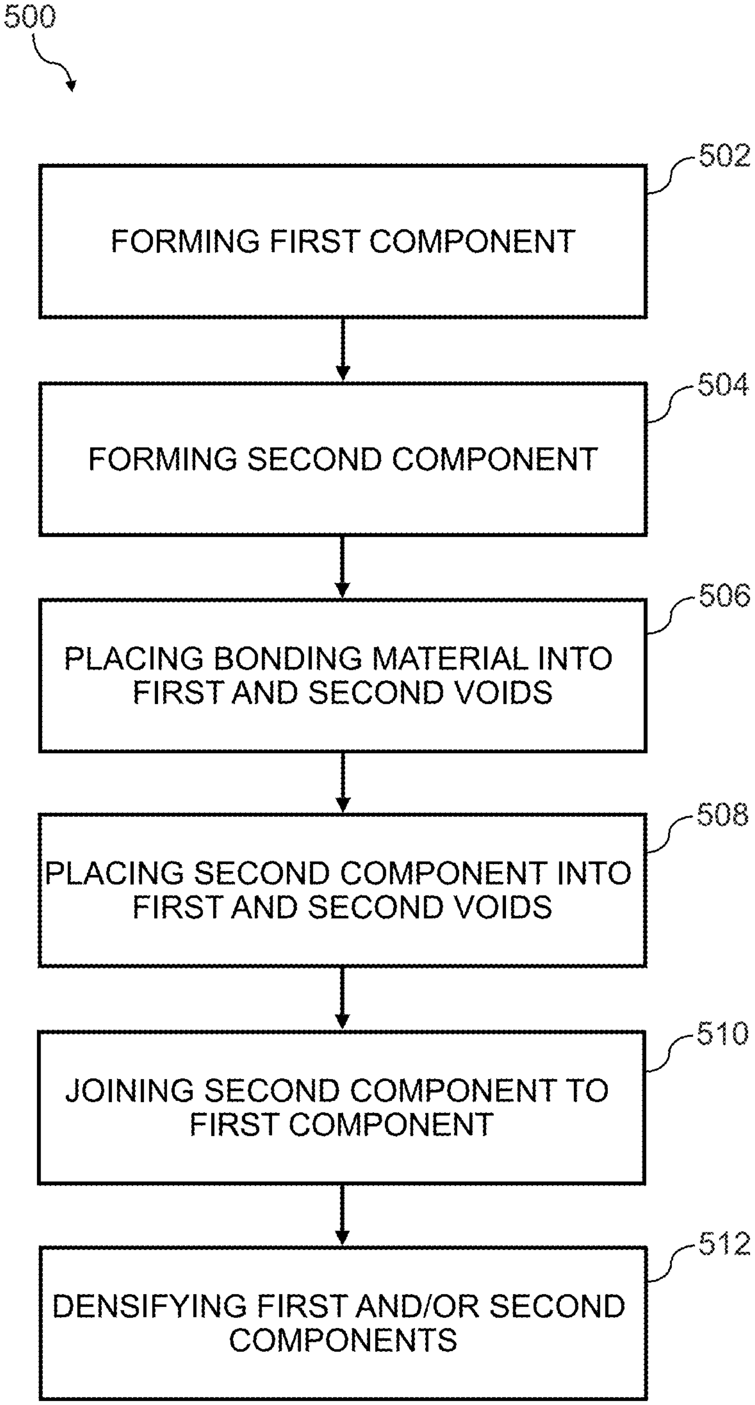
FIG. 16 is a block diagram of an exemplary method for forming an assembly segment of an assembly for a gas turbine engine.

Now referring to FIG. 16, a flow diagram of a method 500 of forming an assembly segment for an assembly, such as a turbine vane frame assembly, is provided. The method 500 may be implemented to form assembly segments as shown in FIGS. 3-15.

As is depicted, the method 500 includes at (502) forming a first component. Forming the first component may include laying up plies of CMC material and processing the plies to form a single-formed first component, or may include forming the first component from a ceramic material. The first component may be a component as shown in FIGS. 3-10 and 12-15, including a first band, a second band, and a first vane that are single-formed. Alternatively, the first component may be a component as shown in FIG. 11, including a first band and a first vane that are single-formed.

The method 500 includes at (504) forming a second component. Forming the second component may include laying up plies of CMC material and processing the plies to form a single-formed second component, or may include forming the second component from a ceramic material. The second component may be a second vane as shown in FIGS. 3-10 and 12-15. Alternatively, the second component may include a second vane and a second band, as shown in FIG. 11.

The method 500 includes at (506) placing a bonding material into a first void of the first component and a second void of the second component and/or onto the second component. As described above, the bonding material joins the first and second components in the first and second voids. Specifically, the bonding material may be placed on a tapered surface when the first void or the second void is a funnel, on a pocket surface when the first void or the second void is a pocket, or on a tapered edge of the second vane. Alternatively, when the first void or the second void have straight sides, the bonding material may be placed on the portions of the first band and the second band facing the first void and the second void or onto the surface of the second vane.

The method 500 includes at (508) placing the second component into the first and second voids. Specifically, one of the first band or the second band defines a void, and the other of the first band or the second band defines a pocket, and the second component is placed through the void and into the pocket. In particular, the second vane of the second component defines an end that is placed into the pocket.

The method 500 includes at (510) joining the second component to the first component. As described above, the second component may be joined to the first component with one or more features. As shown in FIGS. 8-10, the second component may be joined to the first component by applying a force to the second component and spreading the bonding material through the pocket. As shown in FIGS. 11-13C, the second component may be joined to the first component with a fillet or joint. In particular, the second vane may define an end and a side surface, and the fillet may extend around the side surface of the second vane. Joining the second part to the first part with the fillet may include laying one of a slurry, a CMC material, or a noodle to form the fillet. As shown in FIGS. 14-15, the second component may be joined to the first component with a cap. Specifically, the cap may have a bottom surface that is secured to a top surface of the second vane and a top surface of the first band with a bonding material.

The method 500 includes at (512) densifying at least one of the first component or the second component. As described above, one or both of the first component and the second component may be a green component that has not undergone densification. In such a form, the first and/or second components are processed such that the assembly segment is fully densified. It will be appreciated that step (512) may be omitted when the first component and the second component are both fully densified prior to joining.

Further aspects are provided by the subject matter of the following clauses:

An assembly for a gas turbine engine, the assembly including a plurality of assembly segments connected in a 360 degree arrangement, each assembly segment of the plurality of assembly segments including a first band, a second band, a first vane extending from the first band to the second band, the first vane being single-formed with the first band and the second band, and a second vane extending from the first band to the second band, wherein the second vane is joined to the first band with a first joint, and the second vane is joined to the second band with a second joint.

The assembly of any of the preceding clauses, wherein the first band defines a leading edge and a trailing edge, the leading edge defining a leading circumferential length and the trailing edge defining a trailing circumferential length, wherein the leading circumferential length is smaller than the trailing circumferential length.

The assembly of any of the preceding clauses, wherein the second band defines a leading edge and a trailing edge, wherein the trailing edge of the first band and the trailing edge of the second band define a nozzle.

The assembly of any of the preceding clauses, wherein the second band defines a leading edge and a trailing edge, the leading edge defining a leading circumferential length and the trailing edge defining a trailing circumferential length, wherein the leading circumferential length is smaller than the trailing circumferential length.

The assembly of any of the preceding clauses, wherein the leading edge of the first band and the leading edge of the second band define a turbine center frame.

The assembly of any of the preceding clauses, wherein the trailing edge of the first band is outward from the leading edge of the first band in a radial direction.

The assembly of any of the preceding clauses, wherein the first band, the first vane, and the second vane are formed of a ceramic matrix composite (CMC) material.

The assembly of any of the preceding clauses, wherein the first joint is one of a slurry, a fillet, a cap, or a noodle.

The assembly of any of the preceding clauses, wherein the first band defines a void, the second band defines a pocket, and the second vane defines a first end disposed in the void and a second end disposed in the pocket.

The assembly of any of the preceding clauses, wherein the first joint includes a bonding material extending from the first band to the first end of the second vane.

The assembly of any of the preceding clauses, wherein the second joint includes a bonding material disposed in the pocket and extending from the second band to the second end of the second vane.

The assembly of any of the preceding clauses, wherein the first vane defines a slot extending from the first band to the second band.

The assembly of any of the preceding clauses, wherein the second vane is solid.

The assembly of any of the preceding clauses, wherein the first band includes an extension extending outward in a radial direction from the first band.

The assembly of any of the preceding clauses, wherein the second band includes an extension extending inward in a radial direction from the second band.

The assembly of any of the preceding clauses, wherein the plurality of assembly segments define a turbine vane frame assembly, the turbine vane frame assembly including an outer band including the first band of each of the plurality of assembly segments and an inner band including the second band of each of the plurality of assembly segments.

The assembly of any of the preceding clauses, wherein the outer band defines a leading edge and a trailing edge, wherein the trailing edge is disposed outward of the leading edge in a radial direction.

The assembly of any of the preceding clauses, wherein the inner band defines a leading edge and a trailing edge, wherein the trailing edge is disposed outward of the leading edge in a radial direction.

The assembly of any of the preceding clauses, wherein the outer band and the inner band define a flowpath from a core duct to a low pressure turbine.

The assembly of any of the preceding clauses, wherein a pitch angle of the respective first vane of each of the plurality of assembly segments is a same angle.

An assembly segment of an assembly for a gas turbine engine, the assembly segment including a first component including a first band and a first vane extending from the first band, the first band single-formed with the first vane, and a second component including a second band, and a second vane extending from the second band, the second band single-formed with the second vane, wherein the second vane is joined to the first band with a first joint, and the first vane is joined to the second band with a second joint.

The assembly segment of any of the preceding clauses, wherein the first component and the second component are formed of a ceramic matrix composite (CMC) material.

The assembly segment of any of the preceding clauses, wherein the first joint is one of a slurry, a fillet, a cap, or a noodle.

The assembly segment of any of the preceding clauses, wherein the second joint is one of a slurry, a fillet, a cap, or a noodle.

The assembly segment of any of the preceding clauses, wherein the second band defines a pocket and the first vane is disposed in the pocket.

The assembly segment of any of the preceding clauses, wherein the first joint includes a bonding material disposed in the pocket and extending from the second band to the first vane.

The assembly segment of any of the preceding clauses, wherein the pocket defines a tapered surface and the first vane has a tapered edge engaging the tapered surface.

The assembly segment of any of the preceding clauses, wherein the bonding material is free of silicon veins.

The assembly segment of any of the preceding clauses, wherein the second band defines a void and the first vane is disposed in the void.

The assembly segment of any of the preceding clauses, wherein the second band includes a top surface and a bottom surface, and the void tapers from the top surface to the bottom surface.

The assembly segment of any of the preceding clauses, wherein the first vane defines a tapered edge disposed in the void.

The assembly segment of any of the preceding clauses, wherein the first component defines a leading edge and a trailing edge, the leading edge defining a leading circumferential length and the trailing edge defining a trailing circumferential length, wherein the leading circumferential length is smaller than the trailing circumferential length.

The assembly segment of any of the preceding clauses, wherein the second component defines a leading edge and a trailing edge, the leading edge defining a leading circumferential length and the trailing edge defining a trailing circumferential length, wherein the leading circumferential length is smaller than the trailing circumferential length.

The assembly segment of any of the preceding clauses, wherein the trailing edge of the first component and the trailing edge of the second component define a nozzle.

The assembly segment of any of the preceding clauses, wherein the leading edge of the first component and the leading edge of the second component define a turbine center frame.

The assembly segment of any of the preceding clauses, wherein the trailing edge of the first component is outward from the leading edge of the first component in a radial direction.

The assembly segment of any of the preceding clauses, wherein the first vane is cantilevered from the first band.

The assembly segment of any of the preceding clauses, wherein the first band is outward in a radial direction relative to the second band.

The assembly segment of any of the preceding clauses, wherein the first vane defines an end having a bottom surface, the second band defines a top surface, and the bottom surface of the end is joined to the top surface of the second band with the first joint.

The assembly segment of any of the preceding clauses, wherein the second vane defines an end having a top surface, the first band defines a bottom surface, and the top surface of the end is joined to the bottom surface of the first band with the second joint.

An assembly segment of an assembly for a gas turbine engine, the assembly segment including a first band, a second band, a first vane extending from the first band to the second band, the first vane being single-formed with the first band and the second band, a second vane extending from the first band to the second band, and a fillet joining the second vane to the second band.

The assembly segment of any of the preceding clauses, wherein the fillet is one of a slurry, a ceramic matrix composite (CMC) material, or a noodle.

The assembly segment of any of the preceding clauses, wherein the second band defines a pocket and the second vane is disposed in the pocket, wherein the assembly segment further includes a bonding material disposed in the pocket and extending from the second band to the second vane.

The assembly segment of any of the preceding clauses, wherein the fillet is a same material as the bonding material.

The assembly segment of any of the preceding clauses, wherein the fillet is unitary with the second band.

The assembly segment of any of the preceding clauses, wherein the first band defines a void and the second vane is disposed in the void.

The assembly segment of any of the preceding clauses, wherein the assembly segment further includes a bonding material extending from the first band to the second vane.

The assembly segment of any of the preceding clauses, wherein the first band, the second band, the first vane, and the second vane are formed of a CMC material.

The assembly segment of any of the preceding clauses, wherein the first band defines a leading edge and a trailing edge, the leading edge defining a leading circumferential length and the trailing edge defining a trailing circumferential length, wherein the leading circumferential length is smaller than the trailing circumferential length.

The assembly segment of any of the preceding clauses, wherein the first vane defines a slot extending from the first band to the second band.

The assembly segment of any of the preceding clauses, wherein the second vane is solid.

The assembly segment of any of the preceding clauses, wherein the second vane defines an outer surface, the outer surface defines a perimeter, and the fillet extends around the perimeter of the outer surface of the second vane.

A method for forming an assembly segment of an assembly for a gas turbine engine, the method including laying up a first component, the first component including a first band, a second band, and a first vane, the first component being single-formed, laying up a second component, the second component including a second vane, densifying the first component and the second component, and joining the second component to the first component with a fillet extending from the second vane to the second band.

The method of any of the preceding clauses, wherein joining the second component to the first component with the fillet further includes laying one of a slurry, a CMC material, or a noodle to form the fillet.

The method of any of the preceding clauses, wherein the first band defines a void and the second band defines a pocket, wherein the method further includes placing the second component through the void and into the pocket.

The method of any of the preceding clauses, wherein the fillet is outward of the pocket in a radial direction.

The method of any of the preceding clauses, further including placing a bonding material in the void between the first band and the second vane.

The method of any of the preceding clauses, wherein joining the second component to the first component with the fillet further includes laying the fillet around a perimeter of the second vane.

The method of any of the preceding clauses, wherein laying up the first component further includes laying up plies of a CMC material to form the first band, the first vane, and the second band.

An assembly segment of an assembly for a gas turbine engine, the assembly segment including a band including a top surface and a bottom surface and defining a void extending from one of the top surface or the bottom surface, the band including a tapered surface extending inward and facing the void, a vane having an end disposed in the void and a base extending out from the void, and a bonding material disposed in the void and extending from the end of the vane to the band, wherein the tapered surface defines a first angle relative to the top surface, wherein the end of the vane defines a tapered edge angled from the base at a second angle.

The assembly segment of any of the previous clauses, wherein the bonding material is a slurry configured to spread along the tapered surface and the tapered edge upon application of a force.

The assembly segment of any of the previous clauses, wherein the end of the vane, the band, and the bonding material define a bonding interface that is free of gaps.

The assembly segment of any of the previous clauses, wherein the bonding material is free of silicon veins that are adjacent to the tapered surface or to the tapered edge.

The assembly segment of any of the previous clauses, wherein at least one of the band or the vane is green.

The assembly segment of any of the previous clauses, wherein the void extends from the top surface to the bottom surface.

The assembly segment of any of the previous clauses, wherein the first angle is less than 90 degrees relative to the top surface.

The assembly segment of any of the previous clauses, wherein the first angle is greater than 90 degrees relative to the top surface.

The assembly segment of any of the previous clauses, wherein the void is a pocket extending from one of the top surface or the bottom surface, and the band defines a pocket surface facing the void that is spaced from the other of the top surface or the bottom surface of the band.

The assembly segment of any of the previous clauses, wherein the bonding material extends from the pocket surface to the end of the vane.

The assembly segment of any of the previous clauses, wherein the band is a first band, the assembly segment further including a second band including a top surface and a bottom surface and defining a second void extending from one of the top surface or the bottom surface, wherein the vane has a second end disposed in the second void.

The assembly segment of any of the previous clauses, wherein the second void is a pocket extending from one of the top surface or the bottom surface, the second band defining a pocket surface that is spaced from the other of the top surface or the bottom surface of the band, wherein the bonding material secures the second end of the vane to the pocket surface.

The assembly segment of any of the previous clauses, further including a second vane extending from the first band to the second band, wherein the first band, the second band, and the second vane are single-formed.

The assembly segment of any of the previous clauses, wherein at least one of the band or the vane is formed of a ceramic matrix composite (CMC) material.

A method for forming an assembly segment of an assembly, the method including placing a bonding material along a tapered surface of a band or on an end of a vane, the tapered surface facing a void of the band, applying a force to the vane to spread the bonding material through the void to the tapered surface and to the end, and processing the band, the vane, and the bonding material to form the assembly segment, wherein the band, the vane, and the bonding material define a bonding interface that is free of gaps that lack the bonding material.

The method of any of the previous clauses, wherein at least one of the band or the vane is formed of a CMC material.

The method of any of the preceding clauses, wherein the tapered surface of the band defines a first angle relative to a top surface of the band.

The method of any of the previous clauses, wherein the first angle is less than 90 degrees.

The method of any of the previous clauses, wherein the first angle is greater than 90 degrees.

An assembly segment of an assembly for a gas turbine engine, the assembly segment including a first band, a second band, a first vane extending from the first band to the second band, a second vane extending from the first band to the second band, and a cap secured to the second vane and to the first band.

The assembly segment of any of the preceding clauses, wherein the first band defines a top surface and the cap defines a bottom surface, wherein the assembly segment further includes a bonding material between the top surface of the first band and the bottom surface of the cap, the bonding material securing the second vane to the bottom surface of the cap.

The assembly segment of any of the preceding clauses, wherein the first band defines a void and a top surface, the second vane defines a top surface, and the second vane is disposed in the void such that the top surface of the second vane is flush with the top surface of the first band.

The assembly segment of any of the preceding clauses, wherein the cap defines a bottom surface that is secured to the top surface of the first band and the top surface of the second vane.

The assembly segment of any of the preceding clauses, further including a bonding material disposed between the cap, the first band, and the second vane, wherein the bonding material, the bottom surface of the cap, the top surface of the first band, and the top surface of the second vane define a bonding interface that is free of gaps.

The assembly segment of any of the preceding clauses, wherein the bottom surface of the cap has a first surface area, the top surface of the second vane has a second surface area, and the first surface area is larger than the second surface area.

The assembly segment of any of the preceding clauses, wherein the cap and the second vane are single-formed.

The assembly segment of any of the preceding clauses, wherein the cap and the second vane are formed of a ceramic matrix composite (CMC) material.

The assembly segment of any of the preceding clauses, wherein the first band defines a void, the second band defines a pocket, and the second vane defines a first end disposed in the void and a second end disposed in the pocket.

The assembly segment of any of the preceding clauses, wherein the assembly segment further includes a bonding material extending from the first band to the first end of the second vane and to the cap.

The assembly segment of any of the preceding clauses, further including a bonding material disposed in the pocket and extending from the second band to the second end of the second vane.

The assembly segment of any of the preceding clauses, wherein the first vane defines a slot extending from the first band to the second band.

The assembly segment of any of the preceding clauses, wherein the second vane is solid.

The assembly segment of any of the preceding clauses, wherein the first band defines a void and a tapered surface facing the void.

The assembly segment of any of the preceding clauses, wherein the first band defines a top surface, wherein the tapered surface defines an angle relative to the top surface, and wherein the first angle is less than 90 degrees.

The assembly segment of any of the preceding clauses, wherein the second band defines a bottom surface and a pocket, the pocket defining a pocket surface that is spaced from the bottom surface of the second band.

The assembly segment of any of the preceding clauses, further including a bonding material disposed in the pocket, wherein the second vane is disposed in the pocket, wherein the bonding material extends from the pocket surface to the second vane.

The assembly segment of any of the preceding clauses, wherein the second vane, the second band, and the bonding material define a bonding interface that is free of gaps.

The assembly segment of any of the preceding clauses, wherein the cap has a polygonal shape.

The assembly segment of any of the preceding clauses, wherein the first vane is single-formed with the first band and the second band.

An assembly for a gas turbine engine, the assembly comprising a plurality of the assembly segments of any of the previous clauses connected in a 360 degree arrangement.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An assembly for a gas turbine engine, the assembly comprising:

a plurality of assembly segments connected in a 360 degree arrangement, each assembly segment of the plurality of assembly segments comprising:

a first band;

a second band;

a first vane extending from the first band to the second band, the first vane being single-formed with the first band and the second band; and a second vane extending from the first band to the second band, wherein the second vane is joined to the first band with a first joint, and the second vane is joined to the second band with a second joint.

2. The assembly of claim 1, wherein the first band defines a leading edge and a trailing edge, the leading edge defining a leading circumferential length and the trailing edge defining a trailing circumferential length, wherein the leading circumferential length is smaller than the trailing circumferential length.

3. The assembly of claim 2, wherein the second band defines a leading edge and a trailing edge, wherein the trailing edge of the first band and the trailing edge of the second band define a nozzle.

4. The assembly of claim 3, wherein the leading edge of the first band and the leading edge of the second band define a turbine center frame.

5. The assembly of claim 2, wherein the trailing edge of the first band is outward from the leading edge of the first band in a radial direction.

6. The assembly of claim 1, wherein the second band defines a leading edge and a trailing edge, the leading edge defining a leading circumferential length and the trailing edge defining a trailing circumferential length, wherein the leading circumferential length is smaller than the trailing circumferential length.

7. The assembly of claim 1, wherein the first band, the first vane, and the second vane are formed of a ceramic matrix composite (CMC) material.

8. The assembly of claim 1, wherein the first joint or the second joint is one of a slurry, a fillet, a cap, or a noodle.

9. The assembly of claim 1, wherein the first band defines a void, the second band defines a pocket, and the second vane defines a first end disposed in the void and a second end disposed in the pocket.

10. The assembly of claim 9, wherein the first joint includes a bonding material extending from the first band to the first end of the second vane.

11. The assembly of claim 9, wherein the second joint includes a bonding material disposed in the pocket and extending from the second band to the second end of the second vane.

12. The assembly of claim 1, wherein the first vane defines a slot extending from the first band to the second band.

13. The assembly of claim 1, wherein the second vane is solid.

14. The assembly of claim 1, wherein the second vane defines a tapered edge.

15. The assembly of claim 14, wherein the first band defines a pocket with a tapered surface, and the tapered edge of the second vane is joined to the tapered surface of the pocket with a bonding material.

16. The assembly of claim 1, wherein the plurality of assembly segments define a turbine vane frame assembly, the turbine vane frame assembly including an outer band comprising the first band of each of the plurality of assembly segments and an inner band comprising the second band of each of the plurality of assembly segments.

17. The assembly of claim 16, wherein the outer band defines a leading edge and a trailing edge, wherein the trailing edge is disposed outward of the leading edge in a radial direction.

18. The assembly of claim 17, wherein the inner band defines a leading edge and a trailing edge, wherein the trailing edge is disposed outward of the leading edge in the radial direction.

19. The assembly of claim 16, wherein the outer band and the inner band define a flowpath from a core duct to a low pressure turbine.

20. The assembly of claim 16, wherein a pitch angle of the respective first vane of each of the plurality of assembly segments is a same angle.

* * * * *